US008107084B2

(12) United States Patent
Davidson

(10) Patent No.: US 8,107,084 B2
(45) Date of Patent: Jan. 31, 2012

(54) INTERFERENCE MICROSCOPE WITH SCAN MOTION DETECTION USING FRINGE MOTION IN MONITOR PATTERNS

(75) Inventor: Mark Davidson, Palo Alto, CA (US)

(73) Assignee: Zygo Corporation, Middlefield, CT (US)

(*) Notice: Subject to any disclaimer, the term of this patent is extended or adjusted under 35 U.S.C. 154(b) by 270 days.

(21) Appl. No.: 12/363,617

(22) Filed: Jan. 30, 2009

(65) Prior Publication Data
US 2010/0195112 A1 Aug. 5, 2010

(51) Int. Cl.
G01B 9/02 (2006.01)
(52) U.S. Cl. .......................................... 356/497
(58) Field of Classification Search .............. 356/497, 356/511–516
See application file for complete search history.

(56) References Cited

U.S. PATENT DOCUMENTS

| 4,594,003 A | 6/1986 | Sommargren |
| 5,112,129 A | 5/1992 | Davidson et al. |
| 5,127,731 A | 7/1992 | De Groot |
| 5,208,451 A * | 5/1993 | Deck .......................... 250/201.3 |
| 5,309,277 A | 5/1994 | Deck |
| 5,343,294 A | 8/1994 | Kuchel et al. |
| 5,371,587 A | 12/1994 | De Groot et al. |
| 5,398,113 A | 3/1995 | De Groot |
| 5,473,434 A | 12/1995 | De Groot |
| 5,589,938 A | 12/1996 | Deck |
| 5,594,543 A | 1/1997 | De Groot et al. |
| 5,598,265 A | 1/1997 | De Groot |
| 5,671,050 A | 9/1997 | De Groot |
| 5,757,493 A * | 5/1998 | VanKerkhove ............... 356/511 |
| 5,777,741 A | 7/1998 | Deck |
| 5,953,124 A | 9/1999 | Deck |
| 5,995,224 A | 11/1999 | De Groot |
| 5,999,263 A | 12/1999 | Deck et al. |
| 6,002,483 A * | 12/1999 | Powell .......................... 356/496 |
| 6,011,624 A | 1/2000 | De Groot |
| 6,028,670 A | 2/2000 | Deck |
| 6,038,540 A | 3/2000 | Krist et al. |
| 6,072,581 A | 6/2000 | Stephenson et al. |
| 6,201,609 B1 | 3/2001 | Hill et al. |
| 6,208,424 B1 | 3/2001 | De Groot |
| 6,219,144 B1 | 4/2001 | Hill et al. |
| 6,226,092 B1 | 5/2001 | De Lega |

(Continued)

OTHER PUBLICATIONS

P. de Groot, "Microscopic surface form and roughness," in *Optical Metrology* Encyclopedia of Optics, vol. 3, Wiley-VCH Publishers, Weinheim) p. 2107-2110 (2004).

(Continued)

*Primary Examiner* — Hwa Lee
(74) *Attorney, Agent, or Firm* — Fish & Richardson P.C.

(57) ABSTRACT

An apparatus includes an interferometer configured to generate an interference pattern by combining test light from a test object with reference light reflected from a reference object, the interferometer being further configured to direct at least a first part of a monitor test beam to the test object at a first incident angle and at least a second part of a monitor reference beam to the reference object at a second incident angle, and recombine the first part and the second part of the monitor beams after they reflect from the test and reference surfaces to interfere with one another and form a monitor pattern, where the first and second angles cause the monitor pattern to have spatial interference fringes, and wherein a change in the position of the interference fringes is indicative of a change in a relative position between the test and reference objects.

29 Claims, 9 Drawing Sheets

U.S. PATENT DOCUMENTS

| | | |
|---|---|---|
| 6,252,667 B1 | 6/2001 | Hill et al. |
| 6,313,918 B1 | 11/2001 | Hill et al. |
| 6,327,039 B1 | 12/2001 | De Groot et al. |
| 6,407,816 B1 | 6/2002 | De Groot et al. |
| 6,417,927 B2 | 7/2002 | De Groot |
| 6,525,825 B2 | 2/2003 | De Groot et al. |
| 6,525,826 B2 | 2/2003 | De Groot et al. |
| 6,529,279 B2 | 3/2003 | De Groot et al. |
| 6,624,893 B1 | 9/2003 | Schmit et al. |
| 6,624,894 B2 * | 9/2003 | Olszak et al. ............ 356/511 |
| 6,631,004 B1 | 10/2003 | Hill et al. |
| 6,724,485 B1 * | 4/2004 | Drabarek ............ 356/485 |
| 6,778,280 B2 | 8/2004 | De Groot et al. |
| 6,788,422 B2 | 9/2004 | Deck |
| 6,822,745 B2 | 11/2004 | De Groot et al. |
| 6,987,570 B1 | 1/2006 | Schmit et al. |
| 7,012,700 B2 | 3/2006 | De Groot et al. |
| 7,030,995 B2 | 4/2006 | De Groot et al. |
| 7,046,371 B2 | 5/2006 | De Lega et al. |
| 7,057,741 B1 * | 6/2006 | Mueller et al. ............ 356/512 |
| 7,061,623 B2 | 6/2006 | Davidson |
| 7,068,376 B2 | 6/2006 | De Groot |
| 7,106,454 B2 | 9/2006 | De Groot et al. |
| 7,139,081 B2 | 11/2006 | De Groot |
| 7,177,029 B2 | 2/2007 | De Groot |
| 7,239,398 B2 | 7/2007 | De Groot et al. |
| 7,271,918 B2 | 9/2007 | De Groot et al. |
| 7,277,183 B2 | 10/2007 | Deck |
| 7,289,224 B2 * | 10/2007 | De Lega et al. ............ 356/497 |
| 7,289,225 B2 | 10/2007 | De Groot |
| 7,292,346 B2 | 11/2007 | De Groot et al. |
| 7,298,494 B2 | 11/2007 | De Groot |
| 7,315,382 B2 | 1/2008 | De Groot |
| 7,321,430 B2 | 1/2008 | Deck |
| 7,321,431 B2 | 1/2008 | De Groot |
| 7,324,210 B2 | 1/2008 | De Groot et al. |
| 7,324,214 B2 | 1/2008 | De Groot et al. |
| 7,403,289 B2 | 7/2008 | De Groot |
| 7,405,833 B2 | 7/2008 | Smythe et al. |
| 7,417,743 B2 | 8/2008 | De Groot |
| 7,428,057 B2 | 9/2008 | De Lega et al. |
| 7,446,882 B2 | 11/2008 | De Lega et al. |
| 2002/0001086 A1 | 1/2002 | De Groot |
| 2002/0131053 A1 | 9/2002 | De Groot et al. |
| 2002/0140945 A1 | 10/2002 | De Groot et al. |
| 2002/0140946 A1 | 10/2002 | Groot et al. |
| 2002/0176091 A1 | 11/2002 | Deck |
| 2003/0007156 A1 | 1/2003 | De Groot et al. |
| 2003/0137671 A1 | 7/2003 | De Groot et al. |
| 2003/0197871 A1 | 10/2003 | De Groot |
| 2004/0012791 A1 | 1/2004 | De Lega et al. |
| 2004/0027576 A1 | 2/2004 | De Groot et al. |
| 2004/0046965 A1 | 3/2004 | Hill |
| 2004/0085544 A1 | 5/2004 | De Groot |
| 2004/0189999 A1 | 9/2004 | De Groot et al. |
| 2005/0007599 A1 | 1/2005 | De Groot |
| 2005/0030549 A1 | 2/2005 | Hill |
| 2005/0057757 A1 | 3/2005 | De Lega et al. |
| 2005/0068540 A1 | 3/2005 | De Groot et al. |
| 2005/0073692 A1 | 4/2005 | De Groot et al. |
| 2005/0078318 A1 | 4/2005 | De Groot |
| 2005/0078319 A1 | 4/2005 | De Groot |
| 2005/0088663 A1 | 4/2005 | De Groot et al. |
| 2005/0134862 A1 | 6/2005 | Hill |
| 2005/0151951 A1 | 7/2005 | Hill |
| 2005/0162664 A1 | 7/2005 | Hill |
| 2005/0168754 A1 | 8/2005 | Hill |
| 2005/0168755 A1 | 8/2005 | Hill |
| 2005/0200856 A1 | 9/2005 | De Groot |
| 2005/0237534 A1 | 10/2005 | Deck |
| 2005/0237535 A1 | 10/2005 | Deck |
| 2005/0238289 A1 | 10/2005 | Shull et al. |
| 2006/0158657 A1 | 7/2006 | De Lega et al. |
| 2006/0158658 A1 | 7/2006 | Colonna De Lega et al. |
| 2006/0187465 A1 | 8/2006 | De Groot |
| 2006/0262321 A1 | 11/2006 | De Groot |
| 2007/0002330 A1 | 1/2007 | Hill |
| 2007/0035742 A1 | 2/2007 | Hill |
| 2007/0046953 A1 | 3/2007 | De Groot et al. |
| 2007/0064240 A1 | 3/2007 | Hill |
| 2007/0081167 A1 | 4/2007 | De Groot |
| 2007/0086013 A1 | 4/2007 | De Lega et al. |
| 2007/0086016 A1 | 4/2007 | Carlson |
| 2007/0097380 A1 | 5/2007 | De Groot et al. |
| 2007/0171425 A1 | 7/2007 | De Groot et al. |
| 2007/0206201 A1 | 9/2007 | De Groot et al. |
| 2007/0222988 A1 | 9/2007 | Jiang et al. |
| 2007/0247637 A1 | 10/2007 | De Groot |
| 2008/0018901 A1 | 1/2008 | De Groot |
| 2008/0049233 A1 | 2/2008 | De Groot |
| 2008/0062405 A1 | 3/2008 | Hill |
| 2008/0065350 A1 | 3/2008 | De Groot et al. |
| 2008/0068614 A1 | 3/2008 | De Groot |
| 2008/0117428 A1 | 5/2008 | Hill |
| 2008/0151229 A1 | 6/2008 | Hill |
| 2008/0165345 A1 | 7/2008 | Hill |
| 2008/0165347 A1 | 7/2008 | Groot et al. |
| 2008/0174784 A1 | 7/2008 | Colonna De Lega et al. |
| 2008/0180679 A1 | 7/2008 | De Groot |
| 2008/0180694 A1 | 7/2008 | De Groot et al. |
| 2008/0221837 A1 | 9/2008 | De Groot |
| 2008/0266571 A1 | 10/2008 | Deck |
| 2008/0266574 A1 | 10/2008 | De Groot et al. |
| 2008/0285051 A1 | 11/2008 | Hill |
| 2010/0128278 A1 * | 5/2010 | Deck et al. ............ 356/477 |

OTHER PUBLICATIONS

X. Colonna de Lega and P. de Groot, "Characterization of materials and film stacks for accurate surface topography measurement using a white-light optical profiler," SPIE 6995, paper 25 (2008).

J. L. Seligson, C. A. Callari, J. E. Greivenkamp, and J. W. Ward, "Stability of a lateral-shearing heterodyne Twyman-Green interferometer," Opt. Eng 23(4), 353 (1984).

J. E. Greivenkamp, "Generalized data reduction for heterodyne interferometry," Opt. Eng. 23(4), 350-352 (1984).

G. Lai and T. Yatagai, "Generalized phase-shifting interferometry," J. Opt. Soc. Am. A 8(5), 822-827 (1991).

J. Xu, Q. Xu, L. Chai, "Iterative algorithm for phase extraction from interferograms with random and spatially nonuniform phase shifts," Applied Optics, 47, 480-485 (2008).

H. Guo, M. Chen, "Least-squares algorithm for phase-stepping interferometry with an unknown relative step," Applied Optics, 44, pp. 4854-4859, (2005).

C. Farrell and M. Player, "Phase step measurement and variable step algorithms in phase shifting interferometry," Meas. Sci. Technol. 3, 953 (1992).

E. Ikonen, J. Kauppinen, T. Korkolainen, J. Luukkainen, and K. Riski, "Interferometric calibration of gauge blocks by using one stabilized laser and a white-light source," Appl. Opt. 30, pp. 4477-4478 (1991).

X. Colonna de Lega, P. de Groot and D. Grigg "Dimensional measurement of engineered parts by combining surface profiling with displacement measuring interferometry," Proc. Fringe 2001, The $4_{th}$ International Workshop on Automatic Processing of Fringe Patterns, Wolfgang Osten and Werner Jüptrier Eds., Elsevier, 2001. pp. 333-340 (2001).

P. de Groot, X. Colonna De Lega, D. Grigg, "Step height measurements using a combination of a laser displacement gage and a broadband interferometric surface profiler," SPIE 4478, Interferometry XI: Applications, 127-130, (2002).

A. Oszak and J. Schmit, "High-stability white-light interferometry with reference signal for real-time correction of scanning errors," Opt. Eng. 42, 54-59 (2003).

J. Schmit and A. G. Olszak and S. McDermed, "White light interferometry with reference signal," Proc. SPIE 4777 (2002).

L. Deck, "Vibration-resistant phase-shifting interferometry ," Appl. Opt. 35, 6655-6662 (1996).

S. Kim, M. Kang, and S. Lee, "White light phase-shifting interferometry with self-compensation of PZT scanning errors," Proc. SPIE 3740, 16-19 (1999).

J. Schwider, R. Burow, K.-E. Elssner, J. Gizanna, R. Spolaczyk, and K. Merkel, "Digital wave-front measuring interferometry: some systematic error sources," Appl. Opt. 22, 3421-3432 (1983).

P. de Groot, "Vibration in phase shifting interferometry," J. Opt. Soc. Am. *A* 12(2), 354-365 (1995).

W. H. Press et al., "Fourier Transform of Discretely Sampled Data." §12.1 in "Numerical Recipes in C: The Art of Scientific Computing, 2d ed," Cambridge, England: Cambridge University Press, 500-509, 1992.

N. R. Lomb "Least-squares frequency analysis of unequally spaced data," Astrophysics and Space Science 39 447-462 (1976).

J. D. Scargle, "Studies in astronomical time series analysis. II. Statistical aspects of spectral analysis of unevenly spaced data," Astrophysical Journal 263, 835-853 (1982).

W. H. Press et al., "Spectral Analysis of Unevenly Sampled Data", §13.8 in "Numerical Recipes in C: The Art of Scientific Computing, 2d ed," Cambridge, England: Cambridge University Press, 575-584, 1992.

R. Doloca, R. Tutsch, "Vibration induced phase-shift interferometer," Proc. of SPIE 6292 (2006).

P. De Groot et al., "Optical interferometry for measurement of the geometric dimensions of industrial parts," Applied Optics, vol. 41, No. 19, 3853-3860, Jul. 1, 2002.

U.S. Appl. No. 60/177,912, filed May 19, 2000 and entitled "Height scanning interferometer for determining the absolute position and surface profile of an object with respect to a datum" by P. de Groot et al.

U.S. Appl. No. 61/118,151, filed Nov. 26, 2008 and entitled "Scan error correction in low coherence scanning interferometry" by Mark Davidson et al.

X. Colonna de Lega, P. de Groot and D. Grigg "Dimensional measurement of engineered parts by combining surface profiling with displacement measuring interferometry," Proc. Fringe 2001, The $4^{th}$ International Workshop on Automatic Processing of Fringe Patterns, Wolfgang Osten and Werner Jüptner Eds., Elsevier, 2001. pp. 333-340 (2001).

A. Olszak and J. Schmit, "High-stability white-light interferometry with reference signal for real-time correction of scanning errors," Opt. Eng. 42, 54-59 (2003).

\* cited by examiner

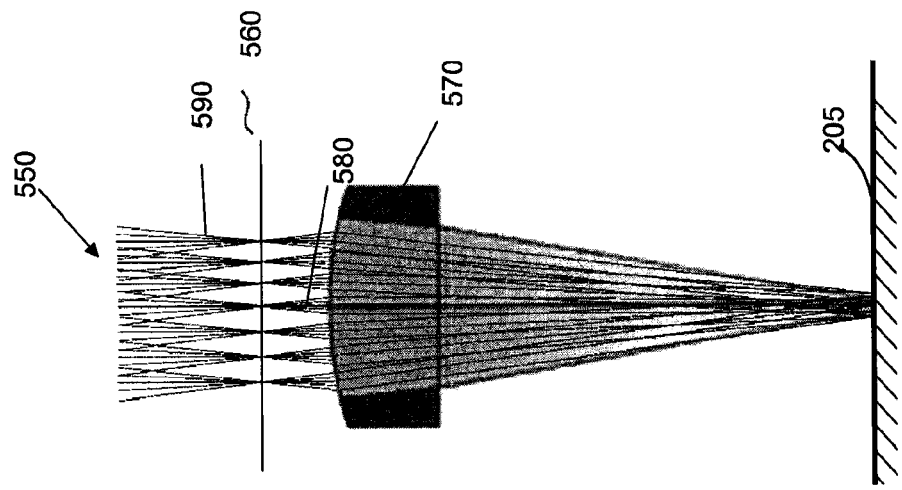
FIG. 5
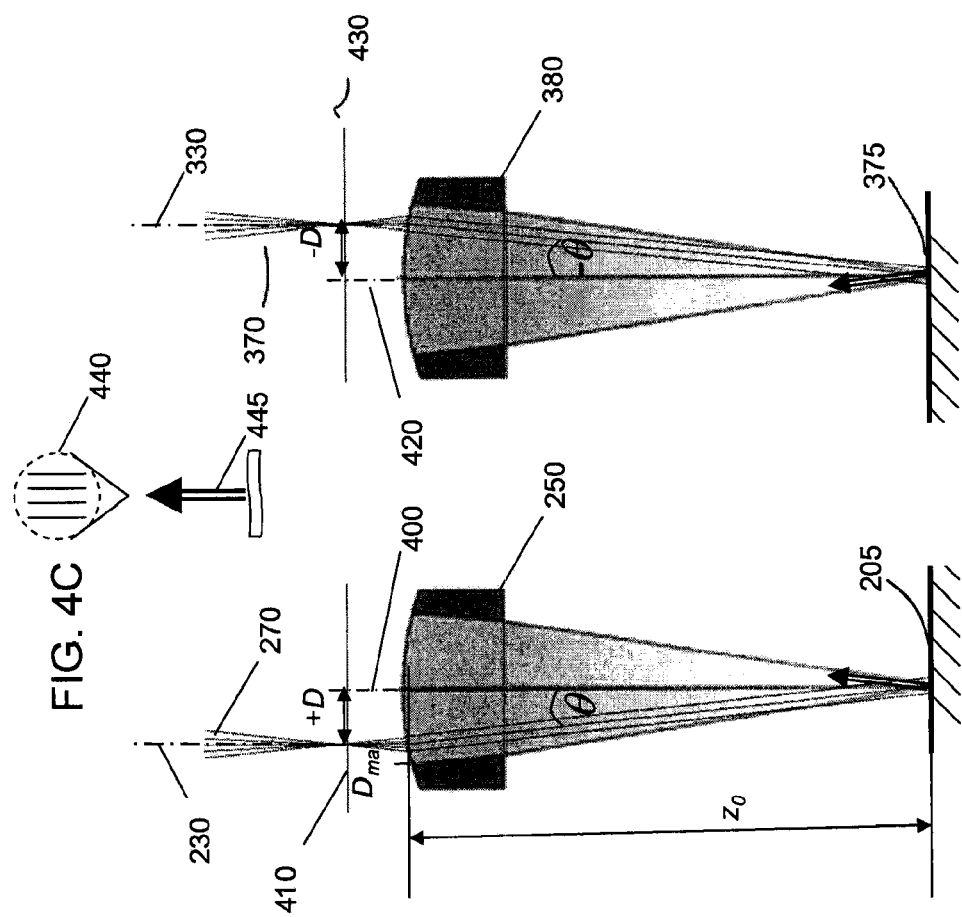
FIG. 4C
FIG. 4B
FIG. 4A

INTERFERENCE MICROSCOPE WITH SCAN MOTION DETECTION USING FRINGE MOTION IN MONITOR PATTERNS

TECHNICAL FIELD

The invention relates to interferometry.

BACKGROUND

Interferometric techniques are commonly used to obtain information about a test object, such as to measure the profile of a surface of the test object. To do so, an interferometer combines test light reflected from the surface of interest with reference light reflected from a reference surface to produce an interferogram (also referred to as an interference pattern). Fringes in the interferogram are indicative of spatial variations between the surface of interest and the reference surface. In many implementations, an interferometer acquires a series of interferograms using a multi-element detector, each interferogram being subject to a slightly varied phase difference between the test light and the reference light. For each detector element, the series of acquired intensity values provides an interferometry signal from which information about the test object can be determined.

A variety of interferometric techniques have been successfully used to characterize a test object. These techniques include low coherence scanning techniques and phase-shifting interferometry (PSI) techniques.

With PSI, the optical interference pattern is recorded for each of multiple phase-shifts between the test light and reference light to produce a series of spatial optical interference patterns that span, for example, at least a half cycle of optical interference (e.g., from constructive, to destructive interference). The sequence of optical interference patterns define a series of intensity values for each spatial location of the pattern, wherein each series of intensity values typically has a sinusoidal dependence on the phase-shifts with a phase-offset equal to the phase difference between the combined test light and reference light for that spatial location. Using numerical techniques, the phase-offset for each spatial location is extracted from the dependence of the intensity values to provide a profile of the test surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference light. The latter application is known as wavelength tuning PSI and is described, e.g., in U.S. Pat. No. 4,594,003 to G. E. Sommargren.

Low coherence scanning interferometry, on the other hand, scans the optical path length difference (OPD) between the test light and reference light over a range comparable to, or larger than, the coherence length of the interfering test and reference light, thereby producing a scanning interferometry signal for each detector element used to detect the interferograms. The coherence length of the light is relatively short compared to the coherence length of light commonly used for PSI and relative to the range of OPD's scanned in a measurement. A low coherence length can be produced, for example, by using a white-light source, which is referred to as scanning white light interferometry (SWLI). A typical SWLI signal is a few fringes localized near the zero OPD position. The signal is typically characterized by a sinusoidal carrier modulation (the "fringes") with bell-shaped fringe-contrast envelope. The conventional idea underlying low coherence interferometry metrology is to make use of the localization of the fringes to measure surface profiles.

Low coherence interferometry processing techniques include two principle trends. The first approach is to locate the peak or center of the envelope, assuming that this position corresponds to the zero OPD of a two-beam interferometer for which one beam reflects from the object surface. The second approach is to transform the SWLI signal into the frequency domain and calculate the rate of change of phase with wavelength, assuming that an essentially linear slope is directly proportional to object position. See, for example, U.S. Pat. No. 5,398,113 to Peter de Groot. This latter approach is referred to as Frequency Domain Analysis (FDA).

Low coherence scanning interferometry can be used to measure surface topography and/or other characteristics of objects having complex surface structures, such as thin film (s), discrete structures of dissimilar materials, or discrete structures that are underresolved by the optical resolution of an interference microscope. Such measurements are relevant to the characterization of flat panel display components, semiconductor wafer metrology, and in-situ thin film and dissimilar materials analysis. See, e.g., U.S. Patent Publication No. US-2004-0189999-A1 by Peter de Groot et al. entitled "PROFILING COMPLEX SURFACE STRUCTURES USING SCANNING INTERFEROMETRY" and published on Sep. 30, 2004, the contents of which are incorporated herein by reference, and U.S. Patent Publication No. US-2004-0085544-A1 by Peter de Groot entitled "INTERFEROMETRY METHOD FOR ELLIPSOMETRY, REFLECTOMETRY, AND SCATTEROMETRY MEASUREMENTS, INCLUDING CHARACTERIZATION OF THIN FILM STRUCTURES" and published on May 6, 2004, the contents of which are incorporated herein by reference.

As explained above, interferometric techniques are used to gain information about an object by analyzing interferograms created by interfering test light from the object and reference light from a reference object. Because the interferogram depends on the relative position between the test object and the reference object, the precision with which the relative position is known influences the quality of the analysis of data acquired using the interferometric technique and, therefore, the information gained about the test object. Accordingly, it can be advantageous to monitor the relative position. In general, the relative position between the test object and the reference object can be monitored in a number of ways. For example, one can monitor the motion of the test object or reference object relative to other components in the interferometer based on a position output signal of a translation stage that is used to vary the position of the test or reference objects (i.e., that varies the OPD), as described in, for example, U.S. Pat. No. 6,822,745 by Peter de Groot et al, entitled "OPTICAL SYSTEMS FOR MEASURING FORM AND GEOMETRIC DIMENSIONS OF PRECISION ENGINEERED PARTS." In some embodiments, an optical calibration of the scan motion of the translation stage can be used. See, e.g., U.S. Pat. No. 7,446,882 by Xavier Colonna de Lega et al. entitled "INTERFEROMETER FOR DETERMINING CHARACTERISTICS OF AN OBJECT SURFACE" and published Nov. 4, 2008, the contents of which are incorporated herein by reference.

SUMMARY

The disclosure relates generally to methods and systems for reducing uncertainty in interferometric techniques. More specifically, the methods and systems are used to reduce errors that can arise in interferometry measurements when an actual phase difference between successive detector frames during the measurement are perturbed from a nominal phase difference. These errors arise from sources like vibration and are referred to as "scan errors."

A potential solution to scan errors is to characterize or monitor the true scan history of the instrument and to feed this information into the signal processing to correct for this information. The scan history can be obtained using a monitor interference pattern obtained as described, for example, in Provisional Patent Application No. 61/118,151 by Mark Davidson et al., entitled "SCAN ERROR CORRECTION IN LOW COHERENCE SCANNING INTERFEROMETRY" and filed on Nov. 26, 2008, the contents of which are incorporated herein by reference.

During interferometric data acquisition, in some embodiments, disclosed systems simultaneously collect conventional interference data and monitor interference data. For example, implementations of an interferometry system can include an optical intra-cavity sensor for monitoring any movement during the interferometric measurement. The optical intra-cavity sensor acquires monitor interference data over several points in a field-of-view (FOV), thereby providing a spatial monitor (interference) pattern with one or more spatial interference fringes.

In general, the intra-cavity sensor can be based on detecting a series of monitor patterns, each being a two dimensional image showing spatial interference fringes. The spatial interference fringes can be generated, for example, by using a small lens at the center of the pupil of a leg of the interferometer. The relative position of the spatial interference fringes within the field-of-view of the monitor pattern depends on the phase difference between the monitor test beam and the monitor reference beam. Thus, the monitor pattern is sensitive to changes in the optical paths within the interferometry system.

In general, as a change of the position of the interference fringes within the monitor pattern is indicative of a change in the OPD for the test and reference object, one can analyze the monitor patterns to monitor any relative movement of components of an interferometry system including any movement of the test object.

The monitor interference data of the monitor pattern can be acquired, for example, with a light source providing coherent or incoherent light and a separate detector or equivalent detection means operating at a single wavelength or wavelength band.

Knowledge of any unintended movement allows compensating for the related scan errors and thereby increases the precision of the assumed scan-positions for the analysis of the interferometric measurement. For example, a processor determines the scan history, e.g., changes in the relative position between the test surface and the reference surface, from the monitor interference data. This information can then be used to correct the conventional interference data prior to any further processing thereby reducing uncertainty due to scan errors.

In general, the disclosed techniques can be applied to a variety of interferometer systems. For example, the techniques can be utilized in interference microscopes configured to image the test object onto the detector (conventional imaging) and/or interference microscopes configured to image a pupil plane of the microscope onto the detector (referred to herein as Pupil-Plane SWLI (PUPS)). Conventional imaging systems provide, for example, 3D profiles of surface features of a test object. PUPS, on the other hand, provides detailed structure information for a small area of the surface, including multi-layer film thickness and index analysis, and the dimensions of optically-unresolved features within the measurement area. Both measurement modes typically use a multi-element detector such as a video camera to collect data over the FOV that covers a surface image or a pupil-plane image.

In conventional imaging and PUPS systems, data is typically acquired over a time scale of $1/10$ to several seconds, and both modes are sensitive to mechanical disturbances occurring during the data acquisition time, where scan errors cause an increase in system noise.

In the measurement of optically-unresolved features using PUPS, the dimensional resolution of the system is inversely proportional to the noise in the interferometrically-derived spectral amplitude, which is a complex function of vibration and scanning errors. It is believed that by reducing the noise due to vibration and scan, a PUPS system's resolution may be substantially enhanced, and may be advantageous allowing PUPS systems to keep up with, e.g., semiconductor processing metrology as features decrease in size.

Low coherence measurements are increasingly employed in production scenarios with poorly-controlled environments, leading to significant vibrational noise. Given the desire to employ advanced optical 3D metrology in these situations, vibration solutions, such as those presented in the methods and systems disclosed herein, are highly desirable.

Various aspects of the invention are discussed below.

In general, in one aspect, the invention features apparatus that include an interferometer configured to generate an interference pattern by combining test light from a test object with reference light reflected from a reference object, the interferometer further configured to direct at least a first part of a monitor test beam to the test object at a first incident angle and at least a second part of a monitor reference beam to the reference object at a second incident angle, and recombine the first part and the second part of the monitor beams after they reflect from the test and reference surfaces to interfere with one another and form a monitor pattern, wherein the first and second angles cause the monitor pattern to have spatial interference fringes, and wherein a change in the position of the interference fringes is indicative of a change in a relative position between the test and reference objects.

Embodiments of the apparatus can include one or more of the following features and/or features of other aspects. For example, in some embodiments, the first and second angles is equal in magnitude and opposite in sign.

The interferometer can include a first objective for directing the test light to the test object, a second objective for directing the reference light to the reference object, and monitoring optics to form the monitor beams. The monitor optics can include at least one monitoring optic positioned within a central portion of each objective. The monitoring optics can include a monitor lens positioned within a central portion of each objective. The objectives can be catadioptric. In some embodiments, the catadioptric objective includes a Schwarzschild objective.

In some embodiments, the interferometer is configured to direct the first part and the second part of the monitor beam to be off-set with respect to an optical axis for the corresponding monitor optic to thereby cause the first and second angles for the monitor beams. The monitor lenses can be off-set in opposite directions from one another.

In certain embodiments, the interferometer is a scanning interferometer comprising a scanning mechanism for scanning an optical path difference (OPD) between the test light and reference light from a common source to a detector positioned to measure the interference pattern. In some embodiments, the apparatus includes the detector positioned to measure the interference pattern as the OPD is scanned and a further detector positioned to measure the spatial interference fringes of the monitor pattern as the OPD is scanned.

In some embodiments, the apparatus includes an electronic processor coupled to the detectors and configured to analyze data corresponding to the interference pattern as the OPD is scanned to determine information about differences between the test object and the reference object using data corresponding to the monitor pattern as the OPD is scanned. The electronic processor can quantify OPD scan increments based on the monitor pattern.

In certain embodiments, the apparatus can include a first light source coupled to the interferometer to provide the light to form the interference pattern, and a second light source coupled to the interferometer to provide the light for the monitor beams. The first light source can be a broadband source and the second light source can be a substantially monochromatic source.

The apparatus can include a detector positioned to measure the interference pattern. The interferometer can define a pupil plane for light emerging from the test object, and the interferometer can be configured to image the pupil plane onto the detector for the interference pattern. The interferometer can be configured to image the test object onto the detector for the interference pattern.

In general, in another aspect, the invention features apparatus that include an interferometer configured to generate an interference pattern by combining test light from a test object with reference light reflected from a reference object, the interferometer being further configured to direct a monitor test beam to the test object and a monitor reference beam to the reference object, and recombine the monitor beams after they reflect from the test and reference surfaces to interfere with one another and form a two dimensional monitor pattern with spatial interference fringes, and where a change in the position of the interference fringes is indicative of a change in a relative position between the test and reference objects.

Embodiments of the apparatus can include one or more features of other aspects.

In general, in another aspect, the invention features apparatus that include an interferometer configured to generate an interference pattern by combining test light from a test object with reference light reflected from a reference object, the interferometer being further configured to provide monitor test light to the test object for measuring a movement of the test object, and the interferometer comprising a test objective configured to provide a first optical path to the test object for the test light, and a second optical path to the test object for the monitor test light, where the first and second optical paths are different from each other, and a detector system configured to detect the interference pattern and to detect a monitor pattern based on the monitor test light and monitor reference light.

Embodiments of the apparatuses can include one or more of the following features and/or features of other aspects.

For example, in some embodiments, the test objective includes at least one monitoring optic for the monitor test light. The test objective can include a catoptric optics for the test light. At least one monitoring optic can be arranged along an axis through the opening.

In some embodiments, the test objective can include a Schwarzschild objective for the object light with a diverging and a focusing mirror. The diverging and focusing mirrors can provide an opening for transmitting the monitor light.

The test objective can include a lens for the test light having a through hole and at least one monitoring optic positioned within the through hole.

In some embodiments, the apparatuses can further include reference optics for monitor reference light having a monitor reference optical path external to the interferometer, and wherein the monitor reference optical path and the second optical path of the monitor test light can be configured to form the monitor pattern.

The detector system can include a monitor detector for detecting the monitor pattern.

In certain embodiments, the apparatus further includes a monitor light source from which the monitor light and the monitor reference light are derived.

In some embodiments, the interferometer further includes a reference objective configured to provide an object reference optical path to a reference surface for reference light and to provide a monitor reference optical path for monitor reference light to the reference surface. The monitor test optical path can have a test offset with respect to a monitor optical axis, and the monitor reference optical path can have a reference offset with respect to a reference optical axis of at least one monitoring optic of the reference objective, and wherein the test offset and the reference offset can be configured to provide overlapping of the monitor test light and the monitor reference light after being reflected from the test surface and reference surface, respectively.

In general, in another aspect, the invention features apparatus that include a microscope and the microscope includes an objective. The objective includes a first focusing optical element providing a first optical path for a first light beam, the first focusing optical element including an opening providing a second optical path for a second light beam, and a second optical element arranged in the second optical path in the opening, wherein the objective directs the first and second beams to the same location on a test object, the objective having a larger numerical aperture at the test object for the first light beam than the second light beam.

Embodiments of the apparatus can include one or more of the following features and/or features of other aspects. For example, the second optical element can be arranged with an offset to an optical axis of the first focusing optical element.

In some embodiments, the first focusing optical element is a first mirror. The first mirror can be a diverging mirror and the opening can be provided in a central region of the diverging mirror.

In some embodiments, the first focusing optical element is a lens and the opening can be provided in a central region of the focusing lens.

The details of one or more embodiments are set forth in the accompanying drawings and the description below. Other features and advantages will be apparent from the description and drawings, and from the claims.

DESCRIPTION OF DRAWINGS

FIG. 4A is an illustration of the optical path of a monitor test beam through the lens of the modified Schwarzschild objective of FIG. 2.

FIG. 4B is an illustration of the optical path of a monitor reference beam through a lens of the modified Schwarzschild objective of FIG. 3.

FIG. 4C is a schematic illustration of the generation of a monitor pattern with the monitor beams of FIGS. 4A and 4B.

FIG. 5 is an illustration of optical paths of partially incoherent monitor light through a lens.

Like reference symbols in the various drawings indicate like elements.

DETAILED DESCRIPTION

Figure 1:
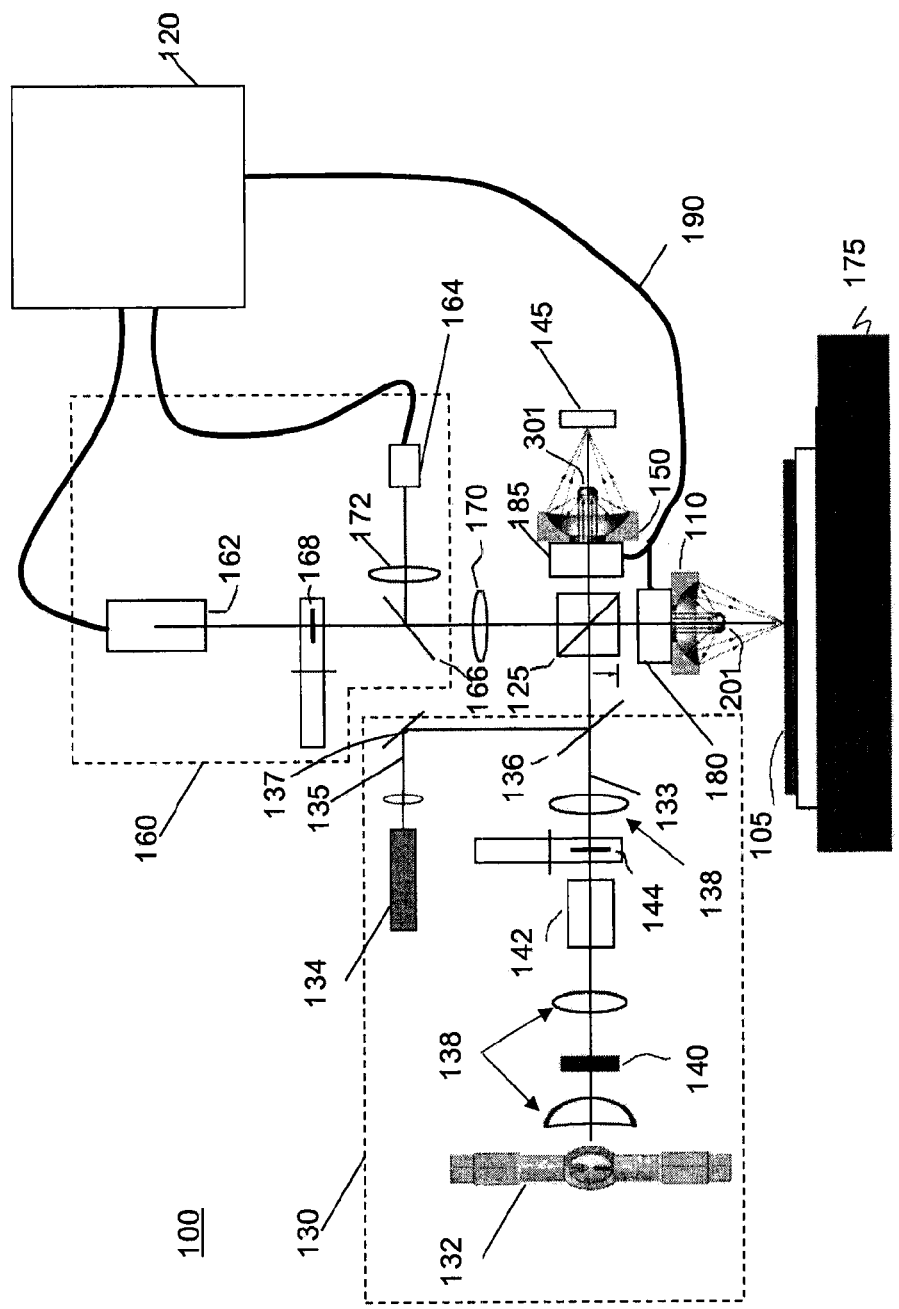
FIG. 1 is a schematic presentation of an embodiment of a low coherence interferometry system for pupil plane imaging.

Referring to FIG. 1, a low coherence interferometry system 100 includes an interference microscope arranged to study a test object 105 with a test objective 110. The interference microscope is in communication with a general purpose computer 120 that performs analysis of data signals from the interference microscope to provide information about test object 105.

The interference microscope includes a beam splitter 125 arranged to reflect illumination from a source sub-system 130 of the interference microscope to test object 105 via test objective 110, and to transmit illumination from source sub-system 130 to a reference object 145 via a reference objective 150. Beam splitter 125 is further arranged to recombine and direct illumination reflected from test object 105 and reference object 145 to a detector sub-system 160 for subsequent detection. In the present system, test objective 110 and reference objective 150 are catadioptric objectives, although as will be explained in more detail below, in general, other types of objectives (e.g., dioptric, or catoptric) can be used.

The source sub-system 130 includes a primary source 132, a secondary source 134, and a beam combiner 136 arranged to combine light from primary source 132 and secondary source 134 and direct the light to beam splitter 125. As will be explained in more detail below, primary source 132 provides low coherence light for the low coherence interferometry measurements while secondary source 134 provides light having a longer coherence length for monitoring the scan. Accordingly, the catadioptric objectives 110 and 150 comprise a catoptric optical system for the light of primary source 132 and a dioptric optical system for the light of secondary source 134.

Primary source 132 is a spatially-extended broadband source providing illumination over a broad band of wavelengths (e.g., an emission spectrum having a full-width, half-maximum (FWHM) of more than 50 nm, or preferably, even more than 100 nm). For example, source 132 can be a white light emitting diode (LED), a filament of a halogen bulb, an arc lamp such as a Xenon arc lamp or a so-called supercontinuum source that uses non-linear effects in optical materials to generate very broad source spectra (e.g., having spectral FWHM of about 200 nm or more). Specific for the interferometric measurement, light of primary source 132 is shaped using a beam forming optics 138, a spectrum shaping filter 140, a homogenizer 142, and a polarizing filter 144, which provide a beam having a homogeneous intensity profile over a cross-sectional area appropriate for test objective 105.

Secondary source 134 has a coherence length that is longer than the coherence length of primary source 132. In some embodiments, secondary source 134 is a highly coherent source, such as a single mode laser source. Source 134 can be a monochromatic source.

Detector sub-system 160 includes a primary detector 162, a secondary detector 164. Primary detector 162 and secondary detector 164 are both multi-element detectors (e.g., multi-element CCD or CMOS detectors). A filter wheel 168 with a polarizing filter allows controlling the polarization of the light detected with primary detector 162. Optionally, detector sub-system 160 includes a bandpass filter that filters the light impinging on secondary detector 164, allowing only light from secondary source 134 to reach the secondary detector 164.

The interference microscope of FIG. 1 is configured for pupil plane imaging. As explained previously, such configurations are referred to as PUPS configurations. This mode of operation can be useful, for example, for determining the complex reflectivity of the test object's surface. To image a pupil plane of the microscope to the primary detector 162, a pupil-plane imaging tube lens 170 is positioned between beam splitter 125 and beam splitter 166. A field stop (not shown) can restrict the sample illumination to a small area on test object 105. Primary detector 162 detects an interference pattern (also referred to as an interferogram or interference image).

In the PUPS configuration, each detector element of primary detector 162 can provide measurements at a multiplicity of wavelengths for a specific angle of incidence and polarization state (according to the polarizing filter of filter wheel 168). The collection of detector elements thus covers a range of angles of incidence, polarization states and wavelengths and provides a set of interferometry signals.

Because each source point illuminating the pupil plane creates a plane wave front for test light illuminating the test object, the radial location of the source point in the pupil plane defines the angle of incidence of this illumination bundle with respect to the object normal. Thus, all source points located at a given distance from the optical axis of correspond to a fixed angle of incidence, by which an objective lens focuses the test light to the test object.

For analysis, electronic processor of computer 120 transforms the interferometry signals from primary detector 162 into a frequency domain and extracts the phase and amplitude information for the different wavelength components of primary light source 132. As the source spectrum can be broad, many independent spectral components can be calculated. The amplitude and phase data can be related directly to the complex reflectivity of test object 105, which can be analyzed to determine information about the test object 105.

The interference microscope also includes an actuator 180 that controls the position of test objective 110 relative to test object 105 and an actuator 185 that controls the position of reference objective 150 relative to reference object 145. For example, actuators 180 and 185 can be a piezoelectric transducer coupled to the objectives to adjust the distance between objectives and objects. Additionally, or alternatively, reference object 145 and reference objective 150 can be are attached rigidly. Actuator 185 is then configured to move reference object 145 and reference objective 150 together as a rigid assembly such that reference object 145 stays in focus. As an example, during data acquisition, in some embodiments, actuator 185 varies the distance between reference object 145 and reference objective 150. As another example, during data acquisition, in certain embodiments, actuator 185 varies the length of the reference optical path by moving reference object 145 and reference objective 150 together. This type of interferometric scan is an example of so-called phase scanning because it scans the relative phase between light reflected from reference object 145 and test object 105. In some embodiments, another actuator is included between the reference object and the reference objective and configured to adjust the distance between the reference object and reference objective while varying the length of the reference optical path by moving reference object 145 and reference objective 150 together with actuator 185.

Test object 105, e.g., a wafer or display panel substrate, is positioned on a mount 175 that allows positioning a region of interest of the surface of test object 105 in the FOV of the interference microscope. During data acquisition, in some embodiments, actuator 185 varies the distance between reference object 145 and reference objective 150. This type of interferometric scan is an example of so-called phase scanning because it scans the relative phase between light reflected from reference object 145 and test object 105.

Alternatively, or additionally to the scanning based on actuator 185, actuator 180 can as another example vary the distance between test object 105 and test objective 110. This type of an interferometric scan is referred to as focus scanning because it scans the position of the focal plane of test objective 110 relative to test object 105. The Linnik-type interferometric microscope of FIG. 1 allows phase and focus scanning types alone or in combination. Other types of interferometry systems may allow only a combined scan of the phase and the focus, such as Mirau-type interferometers.

While in the above described phase scanning, a physical displacement is controlled by the actuators, other types of scanning are also possible. For example, in some implementations, the frequency of the illumination by primary source 132 is varied thereby also varying a phase difference between light reflected from reference object 145 and test object 105. This is called frequency scanning.

As further shown in FIG. 1, primary detector 162 and actuators 180 and 185 are connected to computer 120, which synchronizes scanning and detection and performs the analysis of the detected interferograms.

During operation of system 100, primary source 132 provides input light 133 that is combined with monitor light 135 from secondary source 134 before beam splitter 125. Beam splitter 125 splits the combined light into test light for the test leg of the microscope (including test objective 110) and reference light the reference leg of the microscope (including reference objective 150). Thus, the test light and the reference light both include contributions from primary source 132 and secondary source 134.

After being reflected from test object 105 and reference object 145, beam splitter 125 recombines the light from the test and reference legs. Then, the light of primary source 132 generates an interferogram based on a pupil plane image of first objective 110 on primary detector 162 (according to the PUPS configuration of the system 100 in FIG. 1), while the light of secondary source 134 separated in the monitor test beam and the monitor reference beam, generates an interference pattern (herein further referred to as the monitor pattern) on secondary detector 164. The generation of the monitor pattern is explained in more detail below.

Actuator 180 and/or actuator 185 scan the objectives relative to test object 105 and reference object 145, respectively, and/or an actuator scans the rigidly attached reference object 145 and reference objective 150, thereby varying the OPD between the test light and reference light producing scan-position dependent interferometry signals at each of the detectors. Actuators 180 and 185 are connected to computer 120 via a connection line 190 through which computer 120 can control, for example, the scan-velocity during data acquisition. In addition, or alternatively, actuator 180 and/or actuator 185 can provide information about the scan-motion, such as an intended scan-increment, to computer 120.

While interferometry system 100 is a PUPS mode system, other configurations are also possible. For example, in some embodiments, the reflected and combined light of primary source 132 can form an optical interference pattern on primary detector 162 that corresponds to an image of the test surface. This operation mode is also referred to as conventional imaging. Interferometry system 100 can be configured as a conventional interferometry system, for example, by removal of pupil-plane imaging tube lens 170 from the optical path. To maintain a monitor pattern also in a conventional imaging system, lens 172 before the secondary detector 164 may also be removed from the optical path of the monitor light.

The interferograms detected with primary detector 162 depends on the OPD between the test light and the reference light. In FIG. 1, the OPD is controlled by the underlying scan movement using actuators 180 and/or 185. Typically, the OPD is scanned at a constant velocity and data points are acquired at even time intervals. Accordingly, in principle, each data point is acquired at even increments in the OPD. However, even though the scan is usually assumed to be of constant velocity, the scan motion often deviates from a linear movement due to mechanical imperfections or movement-disturbing vibrations, for example. Thus, the acquired interferometric data can include errors related to the non-uniformity of the scan, which cause deviations of the actual scan-position from a nominal scan-position to which the measured intensity values are associated. These scan errors affect directly the accuracy of the interferometric measurement of test object 105.

Similarly, vibrations can cause scan errors in frequency scanning. For example, vibrations of test object 105 can affect the distance between test object 105 and test objective 110 and, thereby, add an unintended relative phase differences between light reflected from reference object 145 and test object 105.

To reduce measurement uncertainty due to scan errors, implementations of an interferometry system can include an optical intra-cavity sensor for monitoring any movement during the interferometric measurement. In general, the intra-cavity sensor is based on detecting a series of monitor pattern. Each monitor pattern is a two dimensional image that shows spatial interference fringes. The position of the fringes within the monitor pattern depends on the phase difference between the monitor test beam and the monitor reference beam. Thus, the monitor pattern is sensitive to changes in the optical paths within interferometry system.

In general, as a change of the position of the interference fringes within the monitor pattern is indicative of a change in the OPD for the test and reference object, one can analyze the monitor patterns to monitor any relative movement of components of an interferometry system including any movement of the test object. Knowledge of any unintended movement allows compensating for the related scan errors and thereby increases the precision of the assumed scan-positions for the analysis of the interferometric measurement.

In other words, detecting the monitor pattern with sufficient spatial resolution allows deriving a phase contribution of an unknown movement within the interferometry system to the interferometric measurement. In particular, a monitor pattern with several intensity oscillations allows fitting a sinusoidal intensity distribution to derive position information with improved accuracy.

As an example of an optical intra-cavity sensor, secondary source 134, secondary detector 164, and a specifically configured optical path of the monitor light within the interferometry system 100 can monitor and compensate for movement within the interferometry system 100. Changes in the optical paths of system 100 (and therefore variations of the position of the interference fringes in the monitor pattern) can be caused by the scan movement itself, e.g., by a controlled linear variation of the OPD, but also by uncontrolled movements (e.g., vibration) of optical components of the interferometry system 100.

In interferometry system 100, monitor beam 135 propagates as a monitor test beam through the test leg of the microscope and as a monitor reference beam through the reference leg of the microscope. To generate the monitor pattern, at least a first part of the monitor test beam, which is interfering at secondary detector 164 with a respective part of the monitor reference beam, is directed to test object 105 at a first incident angle while the respective part of the monitor reference beam is directed to reference object 145 at a second incident angle.

In general, the monitor pattern is detected in the image plane of an optical system that images the surface of the object onto the sensitive detector elements of secondary detector 164. For that reason, interferometry system 100 of FIG. 1 includes a beam splitter 166 and a compensating lens 172 that are arranged in the optical path of the monitor light and direct the monitor light onto secondary detector 164, thereby imaging the surface of test object 105 onto the detecting surface of secondary detector 164 despite the PUPS configuration of the interferometry system 100. In the presented system, compensating lens 172, therefore, compensates for the PUPS imaging configuration of interferometry system 100.

In contrast, SWLI interferometry systems generates also for the interferometric measurement an image of the surface of the test object onto the sensitive elements of the primary detector 162. Thus, the interferometric measurement and the monitoring of an intra-cavity displacement and/or movement can in principle be performed with the same SWLI detector. In some implementations of SWLI systems, separate detectors are used nevertheless to provide a larger flexibility, e.g., to use essentially the same microscope optics in SWLI and PUPS configurations. However, the derived information about the monitored movement usually will be applied differently in SWLI and PUPS data analysis.

As mentioned above, in general, a variety of optical path configurations for the monitor beam can generate a movement sensitive monitor pattern. In some configurations, specific objectives provide the required phase conditions for the monitor test beam and the monitor reference beam. As an example, FIGS. 2-4 illustrate the concept based on a modified Schwarzschild objective.

Figure 2:
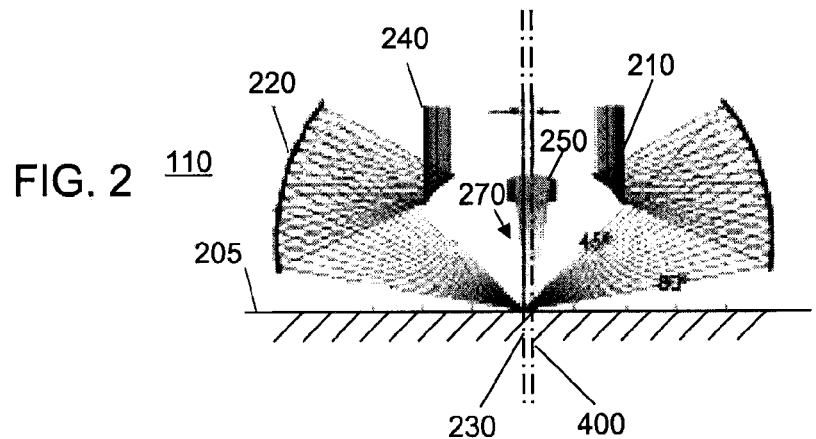
FIG. 2 is a cross-section of a modified Schwarzschild objective in the test leg of the interferometry system of FIG. 1.
Figure 3:
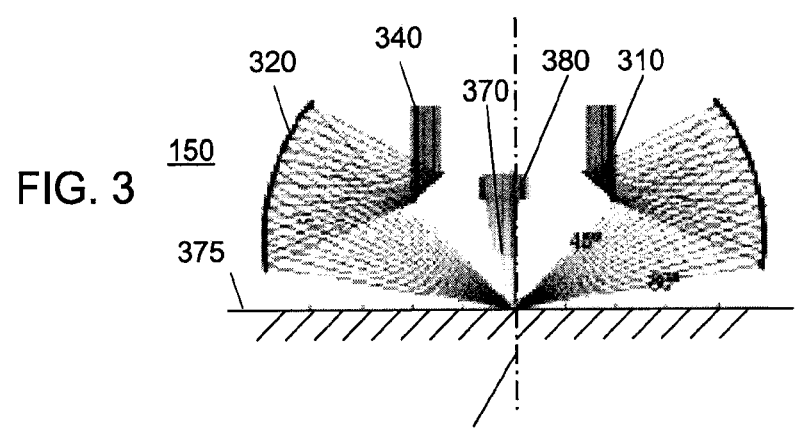
FIG. 3 is a cross-section of a modified Schwarzschild objective in the reference leg of the interferometry system of FIG. 1.

FIG. 2 shows a cross-section through an embodiment of test objective 110 of the test leg, while FIG. 3 shows a cross-section through a corresponding embodiment of reference objective 150 of the reference leg of system 100. Illustrated objectives 110 and 150 are based on Schwarzschild objectives and provide in a compact design the possibility to direct (at least a part of) the monitor light under an angle $\pm\theta$ onto the test object 105 and the reference object 145, respectively. Incident angles of $+\theta$ and $-\theta$, i.e., an object monitor angle that is the negative of the reference monitor angle, is generally only true for an illumination ray exactly on the optical axis. However, as discussed below, it is generally not necessary that only the point along the optical axis is illuminated. The generation of a monitor pattern with beams from these modified Schwarzschild objectives is explained below in connection with FIGS. 4A-4C.

Referring specifically to FIG. 2, test objective 110 includes a conventional high numerical aperture (NA) Schwarzschild objective with a convex center mirror 210 and a ring-shaped concave mirror 220. Convex center mirror 210 reflects incident test light 240 onto ring-shaped concave mirror 220. Concave mirror 220 has a focus point behind the convex mirror 210 on an optical axis 230 of the Schwarzschild objective. Mirrors 210 and 220 focus test light 240 for the interferometric measurement of a test object 205 with incidents angles in the range of, for example, 42°-67° for PUPS imaging.

The central area of test objective 110 is not used for focusing test light 240. Instead, a lens 250 is positioned in the central area of center mirror 210 with an offset with respect to optical axis 230. To illustrate the principle, monitor test beam 270 propagates along optical axis 230 through a hole in center mirror 220 and passes then through lens 250. For a laser monitor illumination, one may illuminate only the optical axis because the beam is highly coherent. However, for a spatially incoherent albeit narrowband monitor illumination, in some embodiments, illumination of a large part of the back aperture of the monitor lens is also possible (as described below in connection with FIG. 5). Because of the offset of lens 250 with respect to optical axis 230, monitor test beam 270 passes off-axis though lens 250 and is, therefore, focused onto test object 205 with a non-orthogonal incident angle.

Monitor test beam 270 is reflected by test object 205 and returns to lens 250 passing off-axis through lens 250 on the opposite side of incoming monitor beam 270. After the second passage through lens 250, monitor test beam 270 propagates parallel to optical axis 230 of the Schwarzschild objective but reflected test beam 270 propagates then at a distance to optical axis 230.

Referring specifically to FIG. 3, objective 150 includes a center mirror 310 and a concave mirror 320 configured as a Schwarzschild objective as well as a lens 380 in a similar configuration as shown in FIG. 2. However, to provide a reflected monitor reference beam 370 that overlaps with reflected monitor test beam 270 after being combined in the interferometric microscope, lens 380 is positioned with an offset with respect to an optical axis 330 of the Schwarzschild objective. The offset is provided in a direction that achieves the desired beam-overlap and the interfering at the secondary detector 164.

In some implementations, lenses 250 and 380 have the same strength and are positioned off-axis with the same offset from optical axes 230 and 330, respectively, but towards opposite directions. Then, reflected monitor test beam 270 and reflected monitor reference beam 370 will generate monitor patterns at secondary detector 164. In FIG. 3, for example, the offset is in a direction in the plane of the cross-section that is opposite to the direction of the offset for lens 250 in objective 110 of FIG. 2. Under this condition detected monitor patterns are sensitive to relative movements of optical components within the monitor beam path. As explained below, the lateral fringe frequency of the interference fringes of the monitor pattern depends on the offset D and the incidence angle θ onto test object 205 and reference object 375.

As the numerical apertures of lenses 250 and 380 is small (e.g., 0.15) relative to the NA of the Schwarzschild objectives, lenses 250 and 350 do not generally resolve most of the structure of the test object and, therefore, there is less background noise that could disturb a phase calculation when processing the monitor pattern.

While FIGS. 2 and 3 indicate an illumination with a monitor beam that has a small beam diameter compared to the diameter of lenses 250 and 380, other illumination configurations are also possible. For example, one can illuminate the complete or at least a large part of the lenses. In addition, one can use a coherent or partially coherent light source for the monitor light, where the illumination with partially coherent light is assumed to correspond to illumination with a set of coherent monitor beams that propagate parallel with respect to each other but are not coherent with each other. In some implementations, coherent illumination is applied to a single spot in the pupil plane of lenses 250 and 380 (herein referred to as localized illumination), while partially coherent illumination can be applied when a larger part of the lens is illuminated.

In the following, the concept of the formation of the monitor pattern is explained for coherent illumination with light of wavelength λ in connection with FIGS. 4A-4C. However, this concept can in general be applied in a similar manner also to partially coherent illumination. An example of a configuration that uses partially coherent light is described below in connection with FIG. 5

FIGS. 4A and 4B illustrate configurations of the optical path for monitor beams through lenses 250 and 380 of objectives 110 and 150, respectively. As shown in FIG. 4A, an optical axis 400 of lens 250 is shifted by a distance D from optical axis 230 of the Schwarzschild objective of test objective 110. The shift is towards the right side of the drawing plane and is indicated as a positive shift, i.e, lens 250 is centered at a position +D with respect to optical axis 230. Thus, monitor test beam 270 illuminates a single spot in a pupil plane 410 of lens 250 at a distance D from optical axis 400 of lens 250, which leads to a plane wave illumination of test object 205 under an angle +θ.

As shown in FIG. 4B, an optical axis 420 of lens 250 is similarly shifted by a distance D from optical axis 330 of the Schwarzschild objective of test objective 150. The shift, however, is towards the left side of the drawing plane and is as indicated as a negative shift, i.e, lens 380 is centered at a position −D with respect to optical axis 330. Thus, monitor test beam 370 illuminates a single spot in a pupil plane 430 of lens 250 at a distance D from optical axis 420 of lens 380, which leads to a plane wave illumination of reference object 375 under an angle −θ. We note that the incoming monitor beams are off-axis with respect to the optical axes 400 and 420 of lenses 250 and 380, respectively, but the incoming monitor beams are on-axis with respect to the optical axes 230 and 330 of the Schwarzschild objectives, respectively.

After recombining monitor test beam 270 and monitor reference beam 370, a monitor pattern 440 can be detected over the beam cross-section of a combined beam 445 as schematically illustrated in FIG. 4C.

The interference intensity of combined beam 445 is given by the formula $$I = |r_{obj}|^2 + |r_{ref}|hu 2 + 2|r_{obj}||r_{ref}|\cos(2kx+\phi)$$

where φ is a phase factor, x is a coordinate perpendicular to the optical axis of the image plane, which runs through the center of the combined beams, and k is a k-number of the monitor pattern 440 in the magnification scale of the object (i.e., in a coordinate system corresponding to the object). The k-number depends on the wavelength λ of the monitor beam and the incident angle θ onto the objects according to:

$$k = k_0 \sin(\theta)$$

and where $k_0 = 2\pi/\lambda$

The first surface of lens 250 is positioned at a distance $z_0$ from the surface of test object 205. Accordingly, the angle θ is defined by $$\sin(\theta) = (D/D_{max})NA$$

where NA is the numerical aperture of lens 250, approximately equal to $D_{max}/z_0$ While the optical path configurations for the monitor beam for generating the monitor patterns can be quite divers, general requirements on the monitor pattern ensure sufficient quality in the analysis of the monitor patterns. In general, any calculations based on interference fringes of the monitor pattern can increase in accuracy when a sufficient number of fringes are available.

In the following mathematical model, the number of fringes in a monitor pattern generated by a monitor beam with a beam diameter of 80 μm is estimated for localized coherent illumination as illustrated in FIGS. 4A-4C. Only specular reflection of light from the test and reference objects is considered in the approximation. However, for non-specular reflection, a movement, e.g., of the test object along the optical axis can also be derived from monitor pattern that include non-specular reflection in a similar manner.

For the model, monitor beam 270 illuminates a spot size of about 80 μm in diameter on test object 205 A clear aperture of lenses 250 and 380 of FIG. 4 is assumed to be 1.5 mm in diameter and a maximal radial distance for the beam off-set is $D_{max}$=0.75 mm. In such cases, an off-axis distance of D=0.5 mm is far enough from the edge of the aperture to avoid vignetting. The k-number for monitor pattern 410 is:

$$k = (2\pi/\lambda)\frac{D}{D_{max}}NA = (2\pi/\lambda)\frac{0.5 \text{ mm}}{0.75 \text{ mm}}0.15.$$

The number of fringes across combined monitor beam 420 in the FOV is accordingly fringe count =

$$\frac{fieldsize}{2\pi/(2k)} = \frac{80\mu}{\pi}k = \frac{80\mu}{\pi}(2\pi/\lambda)\frac{0.5 \text{ mm}}{0.75 \text{ mm}}0.15 = \frac{80\mu}{\lambda}(2/\lambda)\frac{2}{3}0.15 = \frac{16\mu}{\lambda}.$$

Using a 532 nm green laser as source for monitor beams, which laser is inexpensive and can be locked in wavelength to an atomic line, results in a fringe count of about 30 fringes:

$$\text{fringe count} = \frac{16\mu}{0.532\mu} = 30.08 \text{ fringes.}$$

Based on a fringe pattern with 30 fringes, the intensity distribution can be appropriately fitted and the phase, the OPD, and/or their errors can be determined.

In the case that lens 250 and lens 380 are not displaced symmetrically about the optical axis, one can obtain a more general formula for the interference pattern. When a single point in the pupil plane is illuminated, e.g., by narrow bandwidth light, the interference intensity is determined as $$I = |r_{obj}|^2 + |r_{ref}|^2 + 2|r_{obj}||r_{ref}|\cos((k_{\perp ref} - k_{\perp obj}) \cdot x_{\perp} + \phi),$$

where $x_\perp$ is the two dimensional position vector in the image plane with the origin coinciding with the optical axis. $k_\perp \text{ref}$ and $k_{\perp obj}$ are the components of the wave vectors perpendicular to the optical axes for lens 380 in the reference leg and lens 250 in the test leg of the interference microscope, respectively. Because of the Abbé sine condition, the following relations for the incident angles $\theta_{ref}$ and $\theta_{obj}$ and the numerical aperture NA are given $$\sin(\theta_{ref}) = \frac{D_{ref}}{D_{max}} NA \text{ and } \sin(\theta_{obj}) = \frac{D_{obj}}{D_{max}} NA.$$

The relations can be written in terms of the wave vectors $k_{\perp ref}$ and $k_{\perp obj}$ as $$k_{\perp ref} = \pm \frac{D_{ref}}{D_{max}} NA \text{ and } k_{\perp obj} = \pm \frac{D_{obj}}{D_{max}} NA$$

where here $D_{ref}$ and $D_{obj}$ represent the vector displacement of the reference lens and the test lens, respectively, and where the ± sign depends on whether the lens is of the inverting or non-inverting type. Note that the fringe frequency and direction do not depend on which point in the pupil plane is illuminated because illuminating a different point is equivalent to adding a common vector to the pupil vector in each channel, i.e., $$k_{\perp ref} - k_{\perp obj} = \pm \frac{(D_{ref} - D_{obj})}{D_{max}} NA$$

is invariant under $D_{ref/obj} \rightarrow D_{ref/obj} + a$.

The phase factor $\phi$ and the constant terms in the interference signal will in general depend on the displacement vector a.

In the above described case of a coherent narrow bandwidth illumination, only a single point or small localized area of the pupil plane of each lens is illuminated with the monitor beam. Any off-axis position is possible. For the case of a modified Schwarzschild objective, a natural illumination point is the point where the optical axis of the Schwarzschild reflecting optical system intersects the pupil plane of the two lenses, thereby automatically overlapping the reflected monitor beams. The offset of the illumination point is exaggerated in FIGS. 4A and 4B for clarity.

While in FIGS. 4A and 4B a symmetrical displacement of the monitor lenses 250 and 380 is assumed, non-symmetrical configurations are also possible. For example, one of the monitor lenses might be centered on the optical axis, and the other one of the monitor lenses is displaced from the optical axis. Such a non-symmetrical configuration may be simpler to manufacturer than a similar symmetrically displaced configuration.

Alternatively, one can modify Schwarzschild objectives for the use of a partially coherent monitor beam. An example of an optical path configuration for partially coherent illumination is shown in FIG. 5. Partially coherent light 550 flood illuminates a pupil-plans 560 of a lens 570. Lens 570 is positioned on-axis 580 with respect to the incoming monitor test beam. In the system 100, the lens 570 can be on axis with the optical axis of the Schwarzschild objective.

As mentioned above, partially coherent light 550 can be considered to comprise parallel propagating spatially incoherent light beams 590 that each illuminates a single spot of the pupil plane 560. The propagation of partially coherent light 550 through the lenses of the test and reference legs is again configured such that reflected partially coherent light overlaps after the beam splitter of the microscope. Specifically, each of light beams 590 is split into the test and reference legs and superimposed again after reflection. As for the coherent illumination, a fringe pattern appears in the image of the object plane produced by the two lenses. As discussed above, the fringe rate (k-number) produced by any point of illumination is the same as any other point. Because of this, the fringes produced by a multitude of illuminated points add and produce a single monitor pattern (fringed image) also for spatially incoherent illumination that flood illuminates the pupil-planes of the lenses 520 in the test and reference legs. Referring to the foregoing mathematical model, the multitude of light beams 540 through the pupil plane 510 have a variety of values for the vector a but because of the above discussed invariance, light beams 540 will all generate the same fringe frequency and direction. Assuming that the illumination is spatially incoherent in the pupil plane for the partially coherent case, one can ignore cross interference between different points of illumination in the pupil plane, which is a standard approximation. In reality the coherence function would be sharply peaked yielding a small but non-zero spatial coherence length there, which would make a small correction to the ideal interference signal as discussed herein.

In general, the low NA of the lenses (e.g., 0.15 in the above example) used for the monitor beams does not resolve most of the surface structure of, e.g., a wafer, but one still resolves fringes. The low NA, therefore, simplifies the imaging of the fringe pattern by eliminating pattern detail which might confuse phase measuring algorithms or render them less accurate. One can use also a smaller NA but eventually the NA is limited by the need for at least a few fringes within the field-of-view. In the above describe interferometry system 100, the optical path for the intra-cavity sensor relies on a monitor test beam in the test leg and a monitor reference beam in the reference leg. Overlapping the monitor test beam reflected from the test object and the monitor reference beam reflected from the reference object generates the monitor pattern that has a sinusoidal intensity distribution in the plane of detection. The monitor pattern is caused by the inclined incident angle of the monitor test beam and reference test beam on the test object and reference object, respectively. Detecting the monitor pattern with sufficient spatial resolution allows deriving a phase contribution of a movement within the interferometry system 100 to the interferometric measurement. In particular, a monitor pattern with several intensity oscillations allows fitting the sinusoidal intensity distribution to derive position information with improved accuracy. For example, one can detect a movement of the test object along the optical axis of the test objective caused by external vibrations.

Figure 6:
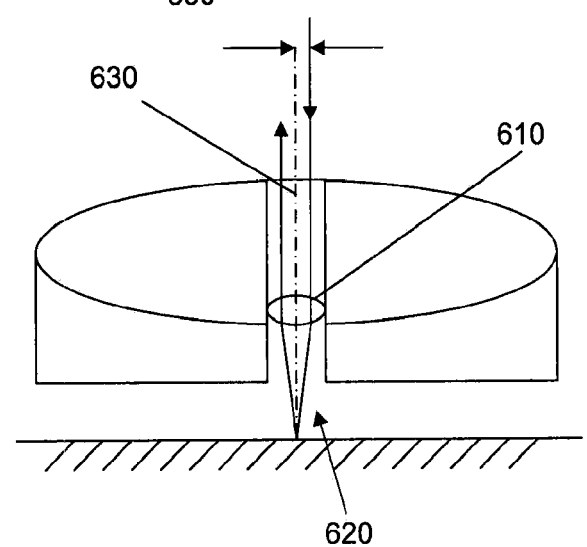
FIG. 6 is a cross-section of a modified dioptric objective.

A number of embodiments have been described. Nevertheless, other implementations are also possible. For example, while the generation of monitor patterns was described above using modified Schwarzschild objectives, other objective configurations are also possible. For example, as shown in FIG. 6, a lens objective 600, e.g., with a high numerical aperture (NA), can be provided with a lens 610 in a central hole 620. Coherent and partially coherent illumination can be performed as discussed above for the modified Schwarzschild objectives.

Moreover, in some implementations only one of the monitor test beam or the monitor reference beam propagates within the microscope as an internal monitor beam in a monitored leg of the microscope. To achieve interference and generate the monitor pattern, the internal monitor beam is overlapped with an external monitor beam. In these implementations, an aperture stop can be provided along the monitor illumination path in the leg not monitored to block any distortion from that leg.

For cavity monitoring with an external and an internal monitor beam, no lens can be used for the internal monitor beam. Instead, the external reference beam is configured to provide the interference. For example, referring to FIG. 1, the external reference beam can be separated from the monitor beam before beam splitter 136 to propagate externally from the interference microscope to secondary monitor 164. In some implementations, a mirror 137 between the secondary light source 134 and beam splitter 136 can be replaced be a semi-transparent mirror such that a part of monitor beam 135 is transmitted to beam splitter 166. Having passed beam splitter 166, the external monitor bean interferes with the internal monitor beam at secondary detector 164. Using an external reference beam, the numerical aperture for the monitor beam may be further decreased thereby reducing unwanted pattern data and speckle to a minimum.

In some implementations, even though FIG. 1 refers to a Linnik-type interferometer, the invention can be used with other types of interferometers, such as Michelson-type and Mirau-type interferometers. As discussed above, the monitor beam can be based on coherent light (e.g., from a laser) or broad bandwidth light that can be used with or without a filter before detecting the fringe pattern.

In some implementations, the lens for the monitor beam in the objective can be replaced, for example, with a prism or any optic that allows generating the monitor pattern when combining the monitor test beam and the monitor reference beam.

In some implementations, an aperture stop can be used to limit the area illuminated with the monitor beam.

Moreover, even though, in the foregoing embodiments low coherence interferometry with OPD scanning was assumed as the underlying measurement, various other types of measurements, such as frequency scanning interferometry, PSI, and auto-focus measurement in microscopy, can benefit from the invention.

Embodiments relate to interferometry systems and methods for determining information about a test object. Additional information about suitable low-coherence interferometry systems, electronic processing systems, software, and related processing algorithms is disclosed in commonly owned U.S. Patent Applications published as US-2005-0078318-A1 entitled "METHODS AND SYSTEMS FOR INTERFEROMETRIC ANALYSIS OF SURFACES AND RELATED APPLICATIONS," US-2004-0189999-A1 entitled "PROFILING COMPLEX SURFACE STRUCTURES USING SCANNING INTERFEROMETRY," and US-2004-0085544-A1 entitled "INTERFEROMETRY METHOD FOR ELLIPSOMETRY, REFLECTOMETRY, AND SCATTEROMETRY MEASUREMENTS, INCLUDING CHARACTERIZATION OF THIN FILM STRUCTURES," the contents of which are incorporated herein by reference.

For some measurement, one may be able to determine the movement information in a pre-scan and use that information to correct interferometric measurements that have been performed with an earlier or later performed measurement. An example for applying such a pre-scan is a highly repetitive scanning movement as, e.g., performed in sinPSI, which is based on a sinusoidal scan movement. Additional information about sinPSI is disclosed in commonly owned U.S. Patent Applications published as US-2008-0180679-A1 entitled "SINUSOIDAL PHASE SHIFTING INTERFEROMETERY," the contents of which are incorporated herein by reference.

Exemplary Applications

The low coherence interferometry methods and systems incorporating scan error correction described above may be used for any of the following surface analysis problems: simple thin films; multilayer thin films; sharp edges and surface features that diffract or otherwise generate complex interference effects; unresolved surface roughness; unresolved surface features, for example, a sub-wavelength width groove on an otherwise smooth surface; dissimilar materials; polarization-dependent properties of the surface; and deflections, vibrations or motions of the surface or deformable surface features that result in incident-angle dependent perturbations of the interference phenomenon. For the case of thin films, the variable parameter of interest may be the film thickness, the refractive index of the film, the refractive index of the substrate, or some combination thereof. Exemplary applications including objects and devices exhibit such features are discussed next.

Semiconductor Processing

The systems and methods described above can be used in a semiconductor process for tool specific monitoring or for controlling the process flow itself. In the process monitoring application, single/multi-layer films are grown, deposited, polished, or etched away on unpatterned Si wafers (monitor wafers) by the corresponding process tool and subsequently the thickness and/or optical properties are measured using the interferometry system employing the scan error correction technique disclosed herein. The average, as well as within wafer uniformity, of thickness (and/or optical properties) of these monitor wafers are used to determine whether the associated process tool is operating with targeted specification or should be retargeted, adjusted, or taken out of production use.

In the process control application, latter single/multi-layer films are grown, deposited, polished, or etched away on patterned Si, production wafers by the corresponding process tool and subsequently the thickness and/or optical properties are measured with the interferometry system employing the scan error correction technique disclosed herein. Production measurements used for process control typical include a small measurement site and the ability to align the measurement tool to the sample region of interest. This site may consists of multi-layer film stack (that may itself be patterned) and thus requires complex mathematical modeling in order to extract the relevant physical parameters. Process control measurements determine the stability of the integrated process flow and determine whether the integrated processing should continue, be retargeted, redirected to other equipment, or shut down entirely.

Specifically, for example, the interferometry systems disclosed herein can be used to monitor the following equipment: diffusion, rapid thermal anneal, chemical vapor deposition tools (both low pressure and high pressure), dielectric etch, chemical mechanical polishers, plasma deposition, plasma etch, lithography track, and lithography exposure tools. Additionally, the interferometry system disclosed herein can be used to control the following processes: trench and isolation, transistor formation, as well as interlayer dielectric formation (such as dual damascene).

Copper Interconnect Structures and Chemical Mechanical Polishing

It is becoming common among chip makers to use the so-called 'dual damascene copper' process to fabricate electrical interconnects between different parts of a chip. This is an example of a process which may be effectively characterized using a suitable surface topography system. The dual damascene process may be considered to have six parts: (1) an interlayer dielectric (ILD) deposition, in which a layer of dielectric material (such as a polymer, or glass) is deposited onto the surface of a wafer (containing a plurality of individual chips); (2) chemical mechanical polishing (CMP), in which the dielectric layer is polished so as to create a smooth surface, suitable for precision optical lithography, (3) a combination of lithographic patterning and reactive ion etching steps, in which a complex network is created comprising narrow trenches running parallel to the wafer surface and small vias running from the bottom of the trenches to a lower (previously defined) electrically conducting layer, (4) a combination of metal deposition steps which result in the deposition of copper trenches and vias, (5) a dielectric deposition step in which a dielectric is applied over the copper trenches and vias, and (6) a final CMP step in which the excess copper is removed, leaving a network of copper filled trenches (and possibly vias) surrounded by dielectric material.

Figure 7A:
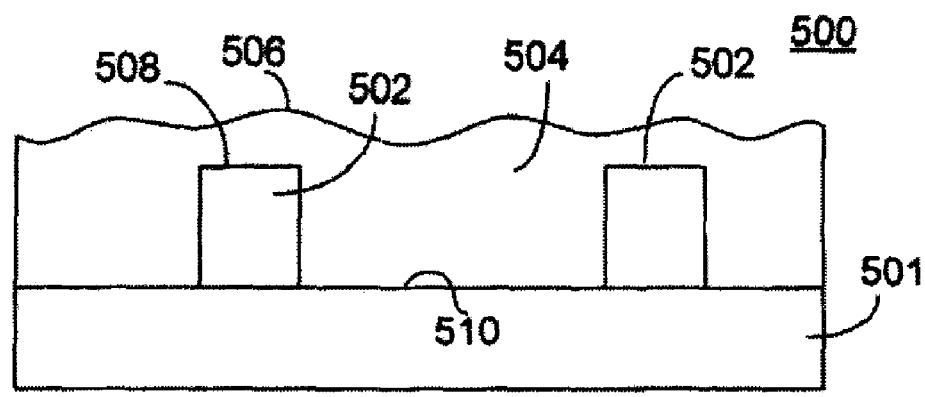
FIG. 7A is a schematic showing a device exemplary of the film structure resulting from the deposition of a dielectric over copper features deposited on a substrate.

Referring to FIG. 7A, a device 500 is exemplary of the film structure resulting from the deposition of a dielectric 504 over copper features 502 deposited on a substrate 501. The dielectric 504 has a non-uniform outer surface 506 exhibiting height variations therealong. Interference signals obtained from device 500 can include interference patterns resulting from surface 506, an interface 508 between copper features 502 and dielectric 504, and an interface 510 between substrate 501 and dielectric 504. The device 500 may include a plurality of other features that also generate interference patterns.

Figure 7B:
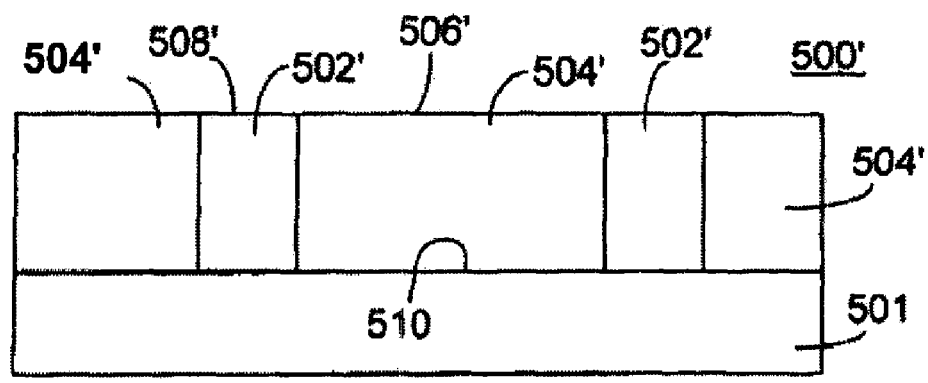
FIG. 7B is a schematic diagram of the device shown in FIG. 20A after undergoing chemical mechanical processing.

Referring to FIG. 7B, a device 500' illustrates the state of device 500 after the final CMP step. The upper surface 506 has been planarized to a surface 506', and interface 508' may now be exposed to the surroundings. Interface 510 at the substrate surface remains intact. Device performance and uniformity depends critically on monitoring the planarization of surface 504. It is important to appreciate that the polishing rate, and therefore the remaining copper (and dielectric) thickness after polishing, depends strongly and in a complex manner on the polishing conditions (such as the pad pressure and polishing slurry composition), as well as on the local detailed arrangement (i.e., orientation, proximity and shape) of copper and surrounding dielectric regions. Hence, portions of surface 506 over copper elements 502 may etch at different rates than other portions of surface 506. Additionally, once interface 508' of copper elements 502' is exposed (as shown in FIG. 7B), the dielectric and copper elements may exhibit different etch rates.

This 'position dependent polishing rate' is known to give rise to variable surface topography on many lateral length scales. For example, it may mean that chips located closer to the edge of a wafer on aggregate are polished more rapidly than those located close to the center, creating copper regions which are thinner than desired near the edges, and thicker than desired at the center. This is an example of a 'wafer scale' process nonuniformity—i.e., one occurring on length scale comparable to the wafer diameter. It is also known that regions which have a high density of copper trenches polish at a higher rate than nearby regions with low copper line densities. This leads to a phenomenon known as 'CMP induced erosion' in the high copper density regions. This is an example of a 'chip scale' process non-uniformity—i.e., one occurring on a length scale comparable to (and sometimes much less than) the linear dimensions of a single chip. Another type of chip scale nonuniformity, known as 'dishing', occurs within single copper filled trench regions (which tend to polish at a higher rate than the surrounding dielectric material). For trenches greater than a few microns in width dishing may become severe with the result that affected lines later exhibit excessive electrical resistance, leading to a chip failure.

CMP induced wafer and chip scale process nonuniformities are inherently difficult to predict, and they are subject to change over time as conditions within the CMP processing system evolve. To effectively monitor, and suitably adjust the process conditions for the purpose of ensuring that any non-uniformities remain within acceptable limits, it is important for process engineers to make frequent non-contact surface topography measurements on chips at a large number and wide variety of locations. This is possible using embodiments of the interferometry methods and systems described above.

In some embodiments one or more spatial properties, e.g., the topography of surface 506 and/or the thickness of dielectric 504, are monitored by obtaining low coherence interference signals from the structure before and/or during CMP. Based on the spatial properties, the polishing conditions can be changed to achieve the desired planar surface 506'. For example, the pad pressure, pad pressure distribution, polishing agent characteristics, solvent composition and flow, and other conditions can be determined based on the spatial properties. After some period of polishing, the spatial property can again be determined and the polishing conditions changed as needed. The topography and/or thickness is also indicative of the end-point at which, e.g., surface 504' is achieved. Thus, the low coherence interference signals can be used to avoid depressions caused by over polishing different regions of the object. The low coherence interference methods and systems are advantageous in this respect because spatial properties of the device, e.g., the relative heights of the surface of the dielectric (a) over copper elements 502 and (b) over substrate surface 510 but adjacent copper elements 502 can be determined even in the presence of the multiple interfaces.

Photolithography

Figure 8A:
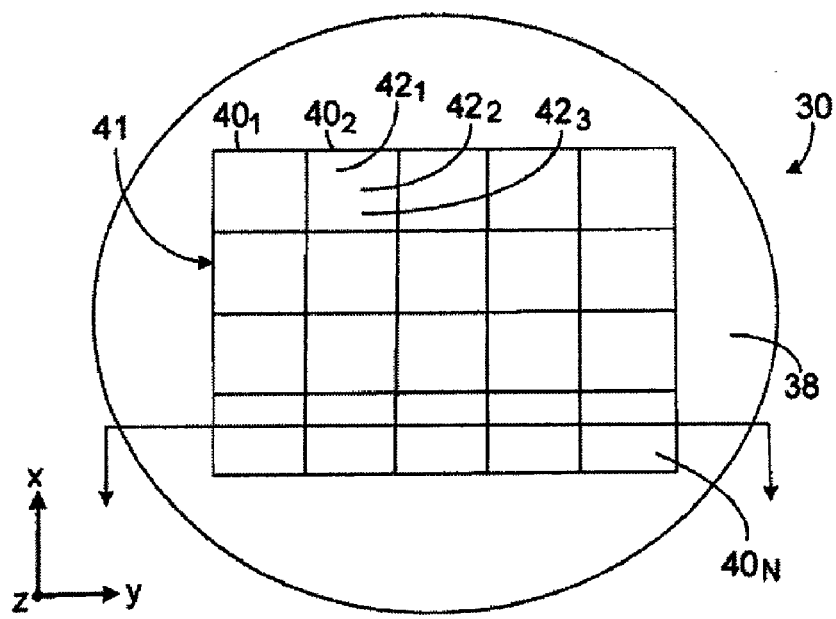
FIG. 8A is a schematic diagram showing a top down view of an object which includes a substrate, e.g., a wafer, and an overlying layer, e.g., photoresist layer.
Figure 8B:
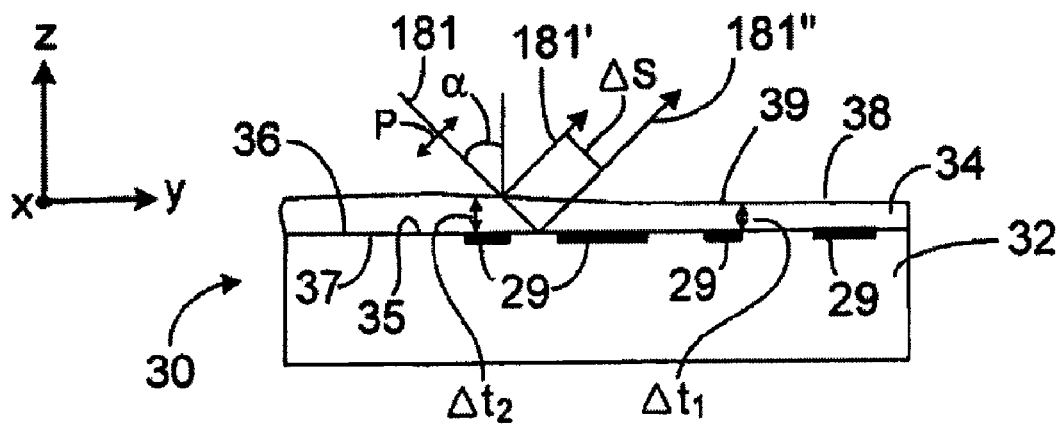
FIG. 8B is a schematic diagram showing a side on view of the object.

In many microelectronics applications, photolithography is used to pattern a layer of photoresist overlying a substrate, e.g., a silicon wafer. Referring to FIGS. 8A and 8B, an object 30 includes a substrate, e.g., a wafer, 32 and an overlying layer, e.g., photoresist layer 34. Object 30 includes a plurality of interfaces as occur between materials of different refractive index. For example, an object-surroundings interface 38 is defined where an outer surface 39 of photoresist layer 34 contacts the environment surrounding object 30, e.g., liquid, air, other gas, or vacuum. A substrate-layer interface 36 is defined between a surface 35 of wafer 32 and a bottom surface 37 of photoresist layer 34. Surface 35 of the wafer may include a plurality of patterned features 29. Some of these features have the same height as adjacent portions of the substrate but a different refractive index. Other features may extend upward or downward relative to adjacent portions of the substrate. Accordingly, interface 36 may exhibit a complex, varying topography underlying the outer surface of the photoresist.

A photolithography apparatus images a pattern onto the object. For example, the pattern may correspond with elements of an electronic circuit (or the negative of the circuit). After imaging, portions of the photoresist are removed revealing the substrate underlying the removed photoresist. The revealed substrate can be etched, covered with deposited material, or otherwise modified. Remaining photoresist protects other portions of the substrate from such modification.

To increase manufacturing efficiencies, more than one device is sometimes prepared from a single wafer. The devices may be the same or different. Each device requires that a subset of the wafer be imaged with a pattern. In some cases, the pattern is sequentially imaged onto different subsets. Sequential imaging can be performed for several reasons. Optical aberrations can prevent achieving adequate pattern focus quality over larger areas of the wafer. Even in the absence of optical aberrations, the spatial properties of the wafer and photoresist may also prevent achieving adequate pattern focus over large areas of the wafer. Aspects of the relationship between the spatial properties of the wafer/resist and focus quality are discussed next.

Referring back to FIGS. 8A and 8B, object 30 is shown with a number N subsets 40i, each smaller than a total area 41 the object to be imaged. Within each subset 40$_i$, spatial property variations, e.g., height and slope variations of the wafer or photoresist, are typically smaller than when taken over the total area 41. Nonetheless, the wafer or photoresist of different subsets 40$_i$ typically have different heights and slopes. For example, layer 34 exhibits thicknesses $\Delta t_1$ and $\Delta t_2$, which vary the height and slope of surface 39. Thus, each subset of the object may have a different spatial relationship with the photolithography imager. The quality of focus is related to the spatial relationship, e.g., the distance between the object and the photolithography imager. Bringing different subsets of the object into proper focus may require relative repositioning of the object and imager. Because of the object height and slope variations, proper subset focus cannot be achieved solely by determining the position and orientation of the object with respect to a portion of the object that is remote to the imaged subset, e.g., a side of the object.

Proper focus can be achieved by determining a spatial property of an object within a subset of the object to be imaged (or otherwise processed). Once the position of the subset has been determined, the object (and/or a portion of the photolithography imager) can be moved, e.g., translated, rotated, and/or tilted, to modify the position of the subset with respect to a reference, e.g., a portion of the photolithography imager. The determination and movement (if necessary) can be repeated for each subset to be imaged.

The determination of the spatial property of the subset can include determining a position and/or height of one or more points of an outer surface of a thin layer of the object, the one or more points lying within the subset of the object to be imaged. For example, the position and orientation of the outer surface 39 of subset 40$_2$ (FIG. 8A) can be determined based upon the positions of points 42$_1$-42$_3$ within the subset. The determination of the spatial property of the subset to be imaged can include using an interferometer to illuminate the subset with light and detecting an interference signal including light reflected from the illuminated subset. In some embodiments, a plurality of subsets is simultaneously imaged with light to obtain a plurality of interference signals. Each interference signal is indicative of one or more spatial properties of a subset. Thus, the interference signals can be used to prepare an image indicative of the topography of the object over a plurality of the subsets. During photolithography of the subsets, the wafer is positioned based upon the topography of the individual subsets as determined from the plurality of interference signals. Hence, each subset can be positioned for optimum focus with respect to the photolithography apparatus.

Detecting an interference signal from each subset of an object to be imaged can include detecting light reflected from the subset and reference light over an OPD range that is at least as large as a coherence length of the detected light. For example, the light may be detected at least over its coherence length. In some embodiments, the interferometer is configured so that the light reflected from the illuminated subset is dominated by light reflected from either an outer interface (such as outer surface 39) or an inner interface (such as interface 36). In some embodiments, a spatial property of an object is determined based on only a portion of the interference signal. For example, if the interference signal includes two or more overlapping interference patterns, a spatial property of the object can be determined based upon a portion of one of the interference patterns that is dominated by contributions from a single interface of the object.

Solder Bump Processing

Figure 9A:
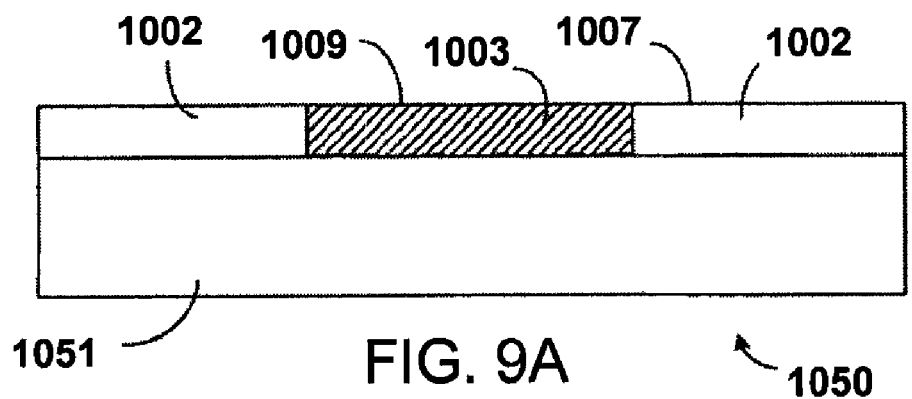
FIG. 9A is a schematic diagram of a structure suitable for use in solder bump processing.
Figure 9B:
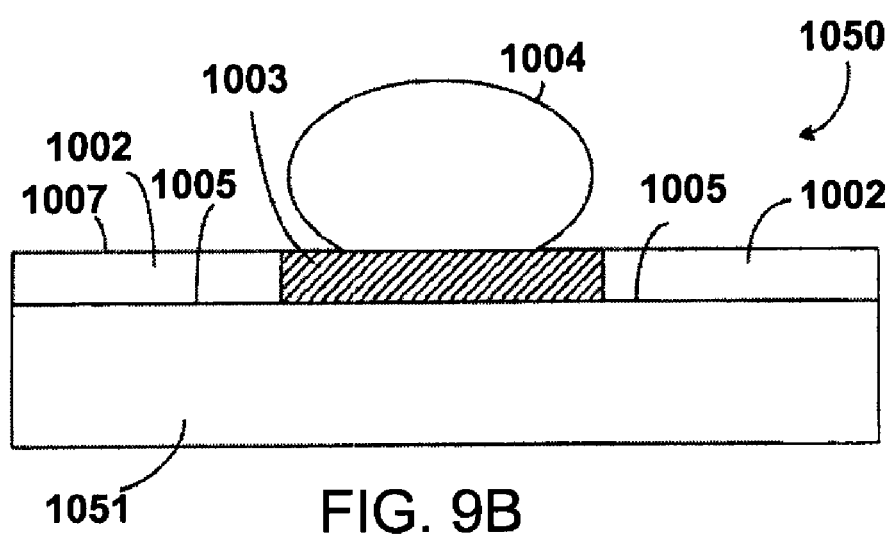
FIG. 9B is a schematic diagram of the structure from FIG. 22A after solder bump processing has occurred.

Referring to FIGS. 9A and 9B, a structure 1050 is exemplary of a structure produced during solder bump processing. Structure 1050 includes a substrate 1051, regions 1002 non-wettable by solder, and a region 1003 wettable by solder. Regions 1002 have an outer surface 1007. Region 1003 has an outer surface 1009. Accordingly, an interface 1005 is formed between regions 1002 and substrate 1051.

During processing a mass of solder 1004 is positioned in contact with wettable region 1003. Upon flowing the solder, the solder forms a secure contact with the wettable region 1003. Adjacent non-wettable regions 1002 act like a dam preventing the flowed solder from undesirable migration about the structure. It is desirable to know spatial properties of the structure including the relative heights of surfaces 1007, 1009 and the dimensions of solder 1004 relative to surface 1007. As can be determined from other discussions herein, structure 1050 includes a plurality of interfaces that may each result in an interference pattern. Overlap between the interference patterns prevents accurate determinate of the spatial properties using known interference techniques. Application of the systems and methods discussed herein allow the spatial properties to be determined.

Spatial properties determined from structure 1050 can be used to change manufacturing conditions, such as deposition times for layers 1002, 1003 and the amount of solder 1004 used per area of region 1003. Additionally, heating conditions used to flow the solder can also be changed based on the spatial properties to achieve adequate flow and or prevent migration of the solder.

Flat Panel Displays

The interferometry systems and methods disclosed herein can be used in the manufacture of flat panel displays such as, for example, liquid crystal displays (LCDs).

Figure 10A:
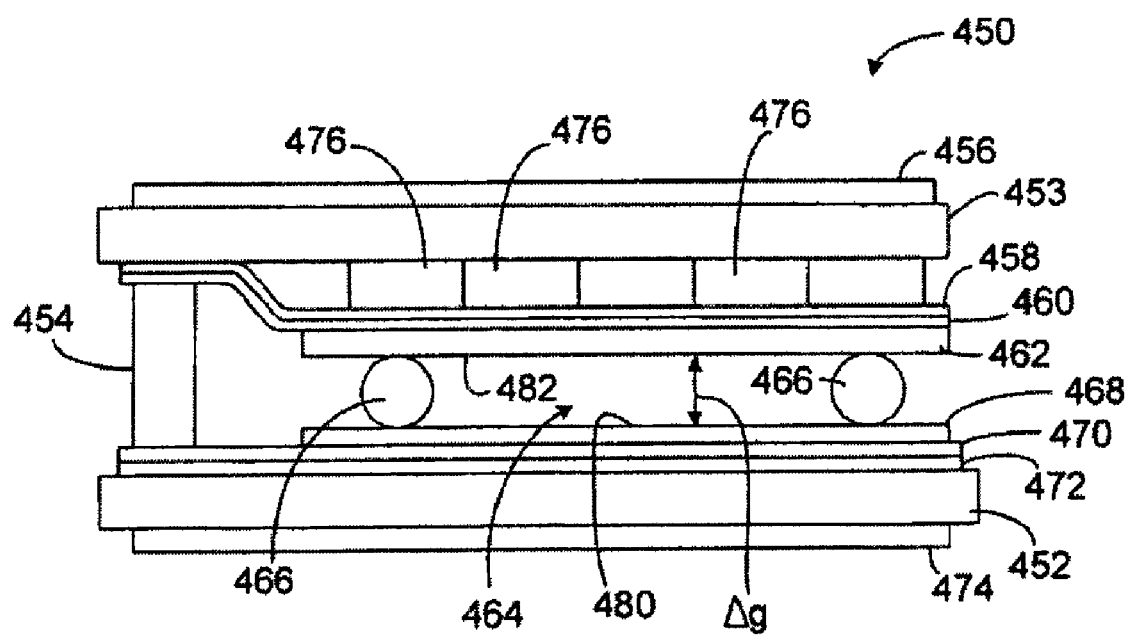
FIG. 10A is a schematic diagram of an LCD composed of several layers.

In general, a variety of different types of LCDs are used in many different applications, such as LCD televisions, desktop computer monitors, notebook computers, cell phones, automobile GPS navigation systems, automobile and aircraft entertainment systems to name a few. While the specific structure of LCDs can vary, many types of LCD utilize a similar panel structure. Referring to FIG. 10A, for example, in some embodiments, a LCD panel 450 is composed of several layers including two glass plates 452,453 connected by an edge seal 454. Glass plates 452 and 453 are separated by a gap 464, which is filled with a liquid crystal material. Polarizers 456 and 474 are applied to the outer surfaces of glass plates 453 and 452, respectively. When integrated into a LCD, one of the polarizers operates to polarize light from the display's light source (e.g., a backlight, not shown) and the other polarizer serves as an analyzer, transmitting only that component of the light polarized parallel to the polarizer's transmission axis. An array of color filters 476 is formed on glass plate 453 and a patterned electrode layer 458 is formed on color filters 476 from a transparent conductor, commonly Indium Tin Oxide (ITO). A passivation layer 460, sometimes called hard coat layer, commonly based on SiOx is coated over the electrode layer 458 to electrically insulate the surface. An alignment layer 462 (e.g., a polyimide layer) is disposed over the passivation layer 460 to align the liquid crystal material in gap 464.

Panel 450 also includes a second electrode layer 472 formed on glass plate 452. Another hard coat layer 470 is formed on electrode layer 472 and another alignment layer 468 is disposed on hard coat layer 470. In active matrix LCDs (AM LCDs), one of the electrode layers generally includes an array of thin film transistors (TFTs) (e.g., one or more for each sub-pixel) or other integrated circuit structures.

The liquid crystal material is birefringent and modifies the polarization direction of light propagating through the LCD panel. The liquid crystal material also has a dielectric anisotropy and is therefore sensitive to electric fields applied across gap 464. Accordingly, the liquid crystal molecules change orientation when an electric field is applied, thereby varying the optical properties of the panel. By harnessing the birefringence and dielectric anisotropy of the liquid crystal material, one can control the amount of light transmitted by the panel.

The cell gap $\Delta g$, i.e., thickness of the liquid crystal material, is determined by spacers 466, which keep the two glass plates 452,453 at a fixed distance. In general, spacers can be in the form of preformed cylindrical or spherical particles having a diameter equal to the desired cell gap or can be formed on the substrate using patterning techniques (e.g., conventional photolithography techniques). The cell gap affects both the amount of optical retardation of light traversing the panel and the viscoelastic response of molecular alignment of the liquid crystal material, and therefore an important parameter to accurately control in LCD panel manufacturing.

In general, LCD panel manufacturing involves multiple process steps in forming the various layers. For example, referring to FIG. 10B, a process 499 includes forming the various layers on each glass plate in parallel, and then bonding the plates to form a cell. As illustrated, initially, TFT electrodes are formed (step 499A1) on a first glass plate. A passivation layer is formed (step 499A2) over the TFT electrodes, and then an alignment layer is formed (step 499A3) over the passivation layer. Next, spacers are deposited (step 499A4) on the alignment layer. Processing of the second glass plate typically involves forming color filters (step 499B1) and forming a passivation layer over the color filters (step 499C1). Then, electrodes (e.g., common electrodes) are formed (step 499B3) on the passivation layer, and an alignment layer is then formed (step 499B4) on the electrodes.

The cell is then formed by bonding the first and second glass plates together (step 499C1), and the cell is then filled with the liquid crystal material and sealed (step 499C2). After sealing, the polarizers are applied to the outer surface of each of the glass plates (step 499C3), providing the completed LCD panel. The combination and ordering of the steps shown in the flow chart are illustrative and, in general, other step combinations and their relative ordering can vary.

Figure 10B:
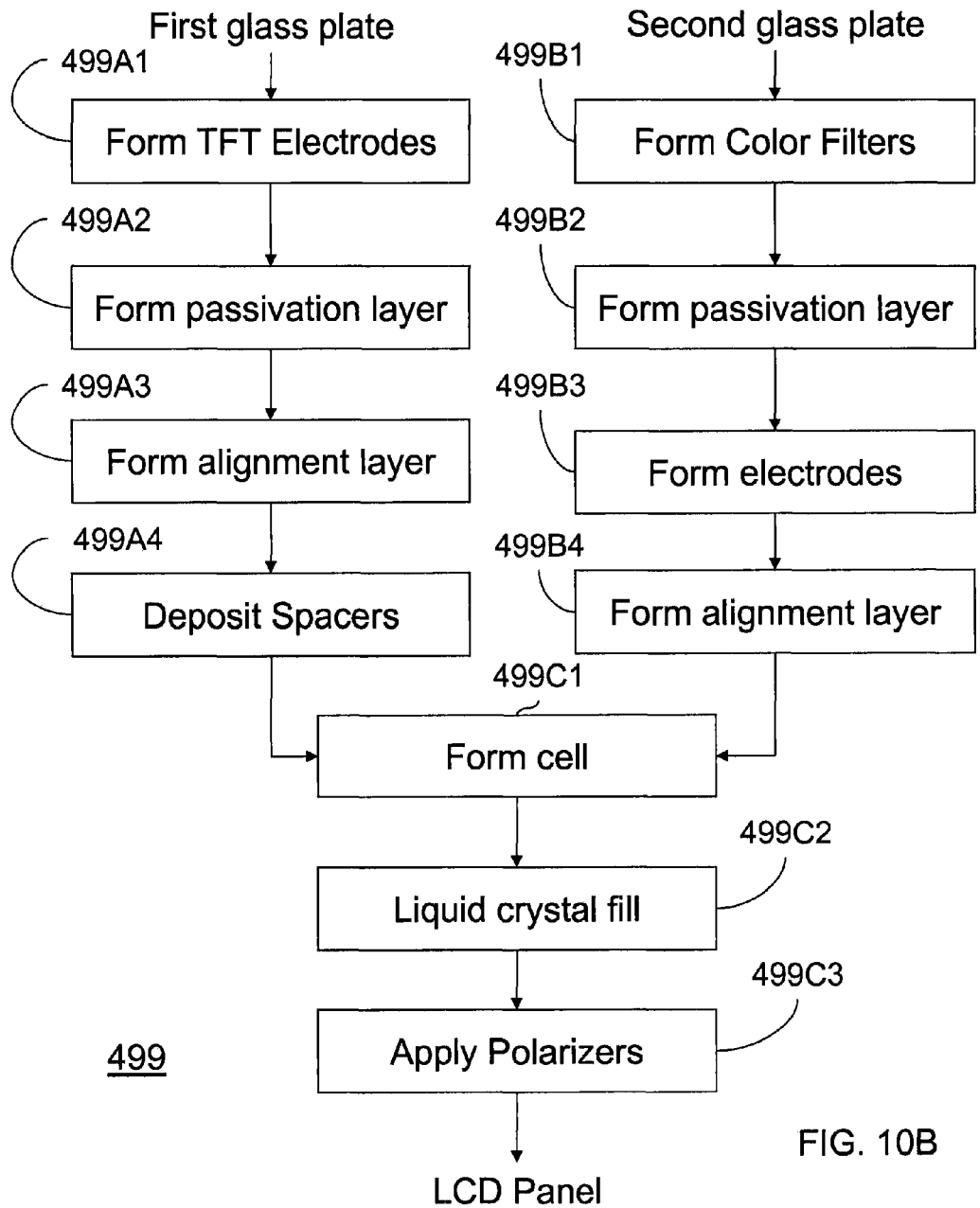
FIG. 10B is a flow chart showing steps in LCD production.

Furthermore, each step illustrated in the flow chart in FIG. 10B can include multiple process steps. For example, forming the TFT electrodes (commonly referred to as "pixel electrodes") on the first glass plate involves many different process steps. Similarly, forming the color filters on the second glass plate can involve numerous process steps. Typically, forming pixel electrodes, for example, includes multiple process steps to form the TFTs, ITO electrodes, and various bus lines to the TFTs. In fact, forming the TFT electrode layer is, in essence, forming a large integrated circuit and involves many of the same deposition and photolithographic patterning processing steps used in conventional integrated circuit manufacturing. For example, various parts of the TFT electrode layer are built by first depositing a layer of material (e.g., a semiconductor, conductor, or dielectric), forming a layer of photoresist over the layer of material, and exposing the photoresist to patterned radiation. The photoresist layer is then developed, which results in a patterned layer of the photoresist. Next, portions of the layer of material lying beneath the patterned photoresist layer are removed in a etching process, thereby transferring the pattern in the photoresist to the layer of material. Finally, the residual photoresist is stripped from the substrate, leaving behind the patterned layer of material. These process steps can be repeated many times to lay down the different components of the TFT electrode layer, and similar deposition and patterning steps are often used to form color filters as well.

In general, the interferometry techniques disclosed herein can be used to monitor production of LCD panels at a variety of different stages of their production. For example, the interferometry techniques can be used to monitor the thickness and/or uniformity of photoresist layers used during LCD panel production. As explained previously, photoresist layers are used in lithographic patterning of TFT components and color filters, for example. For certain process steps, a layer of photoresist can be studied using a low coherence interferometry system prior to exposing the photoresist to patterned radiation. The low coherence interferometry systems can measure a thickness profile of the photoresist layer at one or more locations of the glass plate. Alternatively, or additionally, the techniques can be used to determine a surface profile of the photoresist layer. In either case, where the measured photoresist layer characteristics is within specified tolerance windows, the photoresist layer can be exposed to the desired patterned radiation. Where the photoresist layer is not within the specified window, it can be stripped from the glass plate and a new photoresist layer deposited.

In some embodiments, the interferometry techniques are used to monitor characteristics of a patterned photoresist layer. For example, critical dimensions (e.g., line widths) of patterned features can be studied. Alternatively, or additionally, the interferometry techniques can be used to determine overlay error between the features in the patterned resist and features beneath the photoresist layer. Again, where measured critical dimensions and/or overlay error are outside process windows, the patterned photoresist can be stripped from the substrate and a new patterned photoresist layer formed.

In certain embodiments, the interferometry techniques can be used in conjunction with half-tone photolithography. Increasingly, half-tone photolithography is used where specific thickness variations in the features of a patterned resist layer are desired. The low coherence interferometry techniques disclosed herein can be used to monitor thickness profiles of photoresist patterns in half-tone regions. In addition, the techniques can be used to determine both overlay and critical dimensions of these features.

In some embodiments, the interferometry techniques can be used to detect contaminants (e.g., foreign particles) at different stages on the glass plates at different stages of the production process. Such contaminants can give rise to visual defects (i.e., mura defects) in display panels, ultimately affecting the manufacturer's yield. Often, such defects are only detected by visual inspection, usually performed after the panel has been assembled. The interferometry techniques disclosed herein can be used to perform automated inspection of the glass plates at one or more points during the production process. Where particles are detected, the contaminated surface of the glass plate can be cleaned before the next production step. Accordingly, use of the techniques can reduce the occurrence of mura defects in panels, improving panel quality and reducing manufacturing costs.

Among other factors, the electrooptic properties (e.g., the contrast ratio and brightness) are dependent on the cell gap $\Delta g$. Cell gap control during manufacturing is often critical to obtaining uniform, quality displays. In certain embodiments, the disclosed interferometry techniques can be used to ensure that cell gap has desired uniformity. For example, the techniques can be used to monitor the height and/or position of spacers on a glass plate. Monitoring and controlling spacer height, for example, can reduce cell gap variations across a display.

In some cases, the actual cell gap may differ from the dimensions of spacers because, during assembly, pressure or vacuum is applied to introduce the liquid crystal medium, the edge seals cure and may change dimensions, and the added liquid crystal material can generates capillary forces between the glass plates. Both before and after adding the liquid crystal mater, the surfaces of the exposed layers on the glass plates reflect light that results in an interference pattern indicative of the cell gap $\Delta g$. The low coherence nature of the interference signal either itself or in combination with the described interference signal processing techniques can be used to monitor properties of the cell including the cell gap $\Delta g$ during manufacture even in the presence of interfaces formed by other layers of the cell.

An exemplary method can include obtaining a low coherence interference signal including interference patterns indicative of the cell gap $\Delta g$ prior to adding the liquid crystal material. The cell gap (or other spatial property of the cell) is determined from the interference patterns and can be compared to a specified value. Manufacturing conditions, e.g., a pressure or vacuum applied to the glass plates can be changed to modify the cell gap $\Delta g$ if a difference between the specified value and the determined cell gap exceeds tolerances. This process can be repeated until achieving the desired cell gap. Liquid crystal material is then introduced into the cell. The amount of liquid crystal medium to be added can be determined from the measured spatial property of the cell. This can avoid over- or underfilling the cell. The filling process can also be monitored by observing interference signals from the surfaces of the exposed layers on the glass plates. Once the cell has been filed, additional low coherence interference patterns are obtained to monitor the cell gap $\Delta g$ (or other spatial property). Again, the manufacturing conditions can be changed so that the cell gap is maintained or brought within tolerances. In certain LCDs, the alignment layers include protruding structures that provide desired alignment characteristics to the liquid crystal material. For example, some LCDs have more than one alignment domain for each pixel of the display where protruding alignment structures provide the different align domains. Low coherence interferometry can be used to measure various properties of the protrusions, such as, for example, their shape, line width, height, and/or overlay error with respect to underlying features of the LCD panel. Where the protrusions are determined to be unsatisfactory, they can be repaired or removed and rebuilt as necessary.

In general, low coherence interferometry systems can be set up to monitor various stages of LCD panel production as desired. In some embodiments, inspection stations including an interferometry system can be set up in the manufacturing line itself. For example, monitoring stations can be installed in the clean manufacturing environment where the photolithography steps are performed. Delivery of the glass plates to and from the inspection stations can be entirely automated, being performed robotically. Alternatively, or additionally, inspection stations can be established removed from the manufacturing line. For example, where only samples of the displays are to be tested, the samples can be retrieved from the manufacturing line and taken offline for testing.

Figure 10C:
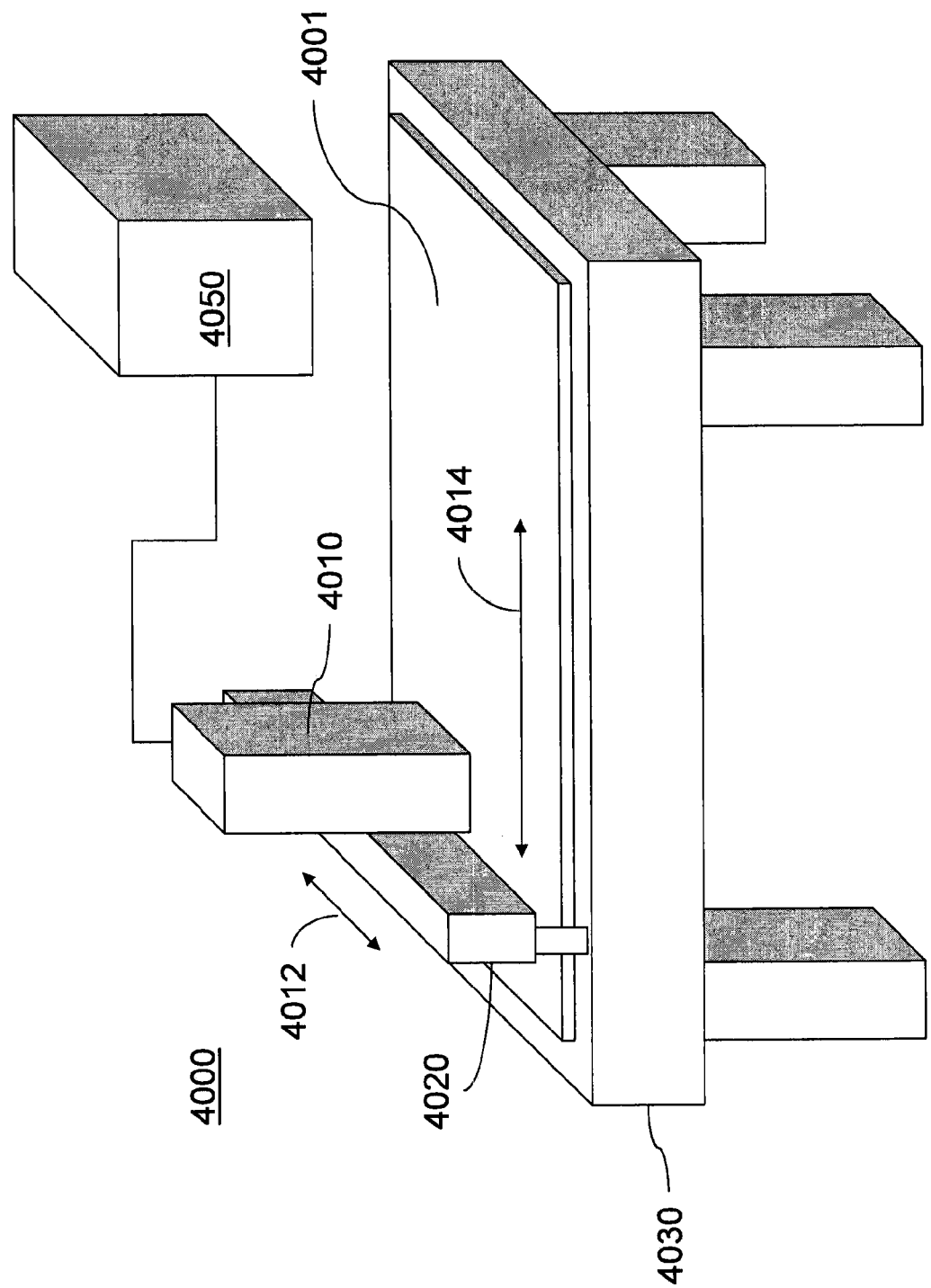
FIG. 10C is a diagram of an LCD inspection station including an interferometry sensor.

Referring to FIG. 10C, an exemplary inspection station 4000 includes a table 4030, which includes a gantry 4020 on which an interferometric sensor 4010 (e.g., an interferometric microscope, such as disclosed previously) is mounted. Table 4030 (which can include vibration isolation bearings) supports a LCD panel 4001 (or glass plate) and positions panel 4001 with respect to sensor 4010. Sensor 4010 is mounted to gantry 4020 via a rail that allows the sensor to move back and forth in the direction of arrow 4012. Gantry 4020 is mounted on table 4030 on rails that allows the gantry to move back and forth in the direction of arrow 4014. In this way, inspection station 4000 can move sensor 4010 to inspect any location on display panel 4001. Station 4000 also includes control electronics 4050 which controls the positioning system for sensor 4010 and acquires the signals from sensor 4010 that include information about panel 4001. In this way, control electronics 4050 can coordinate sensor positioning with data acquisition.

Laser Scribing and Cutting

Lasers can be used to scribe objects in preparation for separating different, concurrently manufactured structures, e.g., microelectronics structures. The quality of separation is related to the scribing conditions, e.g., laser focus size, laser power, translation rate of the object, and scribe depth. Because the density of features of the structure may be large, the scribe lines may be adjacent thin film or layers of the structures. Interfaces associated with the thin film or layers may create interference patterns that appear when interferometry is used to determine the scribe depth. The methods and systems described herein can be used to determine the scribe depth even in the presence of such adjacent films or layers.

An exemplary method can include scribing one or more electronic structures and separating the structures along the scribe lines. Before and/or after separation, low coherence interference signals can be used to determine the depth of scribe. Other scribing conditions are known, e.g., laser spot size, laser power, translation rate. The scribe depth can be determined from the interference signals. The quality of separation as a function of the scribing conditions, including the scribe depth, can be determined by evaluating the separated structures. Based on such determinations, the scribing conditions necessary to achieve a desired separation quality can be determined. During continued manufacturing, low coherence interference signals can be obtained from scribed regions to monitor the process. Scribing conditions can be changed to maintain or bring the scribe properties within tolerances.

Any of the disclosed methods can be analyzed using a computer program. Computer analysis methods can be implemented in hardware or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

A number of embodiments of the invention have been described. Other embodiments are in the claims.

What is claimed is:

1. An apparatus comprising:
    an interference microscope comprising a test objective positioned relative to a test object to receive primary test light reflected from a surface of the test object, the interference microscope being configured to generate an interference pattern by combining the primary test light with primary reference light reflected from a reference object,
    the interference microscope further comprising a first optic and a second optic, the first optic being positioned relative to the test object to direct at least a part of a monitor test beam to the surface of the test object at a first incident angle and the second optic being positioned relative to the reference object to direct at least a part of a monitor reference beam to the reference object at a second incident angle, and recombine the first part of the test and reference monitor beams after they reflect from the test and reference objects to interfere with one another and form a monitor pattern,
    wherein the first and second optics are arranged so that the first and second angles cause the monitor pattern to have spatial interference fringes
    that vary in response to changes in a relative position between the test and reference objects, and the first optic is not in the path of the primary test light.

2. The apparatus of claim 1, wherein the first and second angles are equal in magnitude and opposite in sign.

3. The apparatus of claim 1, wherein the interference microscope comprises a reference objective for directing the primary reference light to the reference object.

4. The apparatus of claim 3, wherein the first optic is positioned at an optical axis of the interference microscope within a central portion of the test objective.

5. The apparatus of claim 4, wherein the first and second optics are each a lens positioned within a central portion of the test and reference objectives, respectively.

6. The apparatus of claim 5, wherein the test and reference objectives are catadioptric.

7. The apparatus of claim 5, wherein the first and second optics are off-set with respect to the optical axis of the interference microscope.

8. The apparatus of claim 7, wherein the lenses are off-set in opposite directions from one another.

9. The apparatus of claim 1, wherein the interference microscope comprises a scanning mechanism for scanning an optical path difference (OPD) between the primary test light and primary reference light from a common source to a first detector positioned to measure the interference pattern.

10. The apparatus of claim 9, further comprising a second detector positioned to measure the spatial interference fringes of the monitor pattern as the OPD is scanned.

11. The apparatus of claim 10, further comprising an electronic processor coupled to the first and second detectors and configured to analyze data corresponding to the interference pattern as the OPD is scanned to determine information about the surface of the test object.

12. The apparatus of claim 11, wherein the electronic processor is configured to compensate the data for motion of the interference microscope relative to the test object as the OPD is scanned based on the monitor pattern.

13. The apparatus of claim 1, further comprising a first light source coupled to the interferometer to provide the primary test and reference light, and a second light source coupled to the interferometer to provide the test and reference monitor beams.

14. The apparatus of claim 13, wherein the first light source is a broadband source, and the second light source is a substantially monochromatic source.

15. The apparatus of claim 1, further comprising a detector positioned to measure the interference pattern.

16. The apparatus of claim 15, wherein the interference microscope defines a pupil plane for light emerging from the test object, and wherein the interference microscope is configured to image the pupil plane onto the detector.

17. The apparatus of claim 15, wherein the interference microscope is configured to image the test object onto the detector.

18. The apparatus of claim 6, wherein the catadioptric objectives are Schwarzschild objectives.

19. An apparatus comprising:
    an interference microscope comprising a test objective positioned relative to a test object to receive primary test light reflected from a surface of the test object, the interference microscope being configured to generate an interference pattern by combining the primary test light with primary reference light reflected from a reference object on a first multi-element detector,
    the interference microscope further comprising a first optic and a second optic, the first optic being positioned relative to the test object to direct a monitor test beam to the surface of the test object and the second optic being positioned relative to the reference object to direct a monitor reference beam to the reference object, and recombine the test and reference monitor beams after they reflect from the test and reference objects to form a two dimensional monitor pattern with spatial interference fringes on a second multi-element detector,
    the first and second optics being arranged so that changes in a position of the spatial interference fringes on the second multi-element detector are indicative of changes in a relative position between the interference microscope and the test object and the first optic is not in the path of the primary test light; and
    an electronic processor coupled to the first and second detectors and programmed to determine information about the surface of the test object based on the interference pattern, where determining the information comprises compensating for motion of the interference microscope relative to the test object based on the monitor pattern.

20. The apparatus of claim 19, wherein the test objective defines an aperture that includes monitoring the first optic.

21. The apparatus of claim 19, wherein the test objective comprises a mirror for the test light.

22. The apparatus of claim 19, wherein the test objective is a Schwarzschild objective with a diverging and a focusing mirror.

23. The apparatus of claim 22, wherein the diverging and focusing mirrors each define an aperture for transmitting the monitor light.

24. The apparatus of claim 23, wherein the first optic is positioned within the apertures.

25. The apparatus of claim 23, wherein the test objective includes a lens for the primary test light defining an aperture and the first optic is positioned within the aperture.

26. The apparatus of claim 19, further comprising a monitor light source from which the monitor light and the monitor reference light are derived.

27. The apparatus of claim 19, wherein the interference microscope comprises a reference objective positioned to receive the primary reference light reflected from the reference object.

28. The apparatus of claim 19, wherein the first and second optics are identical lenses that are offset with respect to an optical axis of the interference microscope.

29. The apparatus of claim 28, wherein the first and second optics are offset from the optical axis by different amounts.

* * * * *

UNITED STATES PATENT AND TRADEMARK OFFICE
CERTIFICATE OF CORRECTION

PATENT NO. : 8,107,084 B2
APPLICATION NO. : 12/363617
DATED : January 31, 2012
INVENTOR(S) : Mark Davidson Page 1 of 1

It is certified that error appears in the above-identified patent and that said Letters Patent is hereby corrected as shown below:

Column 29, line 7, in claim 20, delete "monitoring".

Signed and Sealed this
Third Day of April, 2012

David J. Kappos
*Director of the United States Patent and Trademark Office*